US011539095B2

United States Patent
Yokoyama et al.

(10) Patent No.: US 11,539,095 B2
(45) Date of Patent: Dec. 27, 2022

(54) IN-VEHICLE LITHIUM ION BATTERY MEMBER

(71) Applicant: ASAHI KASEI KABUSHIKI KAISHA, Tokyo (JP)

(72) Inventors: Hiroya Yokoyama, Tokyo (JP); Nozomi Inagaki, Tokyo (JP); Mihoko Yamamoto, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 290 days.

(21) Appl. No.: 16/769,585

(22) PCT Filed: Dec. 4, 2018

(86) PCT No.: PCT/JP2018/044614
§ 371 (c)(1),
(2) Date: Jun. 4, 2020

(87) PCT Pub. No.: WO2019/111910
PCT Pub. Date: Jun. 13, 2019

(65) Prior Publication Data
US 2020/0313131 A1    Oct. 1, 2020

(30) Foreign Application Priority Data

Dec. 6, 2017   (JP) .............................. JP2017-234594

(51) Int. Cl.
*H01M 50/24*    (2021.01)
*H01M 10/0525*  (2010.01)
*C08J 5/00*     (2006.01)
*C08L 71/12*    (2006.01)
*B60K 1/04*     (2019.01)

(52) U.S. Cl.
CPC .............. *H01M 50/24* (2021.01); *C08J 5/00* (2013.01); *H01M 10/0525* (2013.01); *B60K 1/04* (2013.01); *C08L 71/12* (2013.01)

(58) Field of Classification Search
CPC ..................................................... H01M 50/24
See application file for complete search history.

(56) References Cited

U.S. PATENT DOCUMENTS

| 6,403,178 B1 | 6/2002 | Ono et al. |
| 2003/0130421 A1 | 7/2003 | Sato |

(Continued)

FOREIGN PATENT DOCUMENTS

| JP | H1171466 A    | 3/1999 |
| JP | 2003185064 A  | 7/2003 |

(Continued)

OTHER PUBLICATIONS

Jan. 18, 2021, the Supplementary European Search Report issued by the European Patent Office in the corresponding European Patent Application No. 18885579.5.

(Continued)

*Primary Examiner* — Ula C Ruddock
*Assistant Examiner* — Thomas H. Parsons
(74) *Attorney, Agent, or Firm* — Kenja IP Law PC

(57) ABSTRACT

An in-vehicle lithium ion battery member produced by molding a resin composition containing (a) a polyphenylene ether resin, the resin composition having a critical strain in a chemical resistance evaluation of 0.5% or more and a Charpy impact strength at 23° C. of 20 kJ/m² or more.

6 Claims, 3 Drawing Sheets

(56) References Cited

U.S. PATENT DOCUMENTS

| | | | |
|---|---|---|---|
| 2004/0102551 A1 | 5/2004 | Sato et al. | |
| 2014/0357757 A1 | 12/2014 | Levasalmi | |
| 2017/0204263 A1 | 7/2017 | Ishii et al. | |
| 2018/0127580 A1 | 5/2018 | Inagaki et al. | |
| 2019/0185665 A1 | 6/2019 | Inagaki et al. | |

FOREIGN PATENT DOCUMENTS

| | | | |
|---|---|---|---|
| JP | 2003197160 A | 7/2003 | |
| JP | 2004161929 A | 6/2004 | |
| JP | 2005105074 A | 4/2005 | |
| JP | 2013133384 A | 7/2013 | |
| JP | 2016110796 A | 6/2016 | |
| WO | 2014141765 A1 | 9/2014 | |
| WO | 2015098770 A1 | 7/2015 | |
| WO | 2017013833 A1 | 1/2017 | |
| WO | 2017208945 A1 | 12/2017 | |

OTHER PUBLICATIONS

Mar. 5, 2019, International Search Report issued in the International Patent Application No. PCT/JP2018/044614.

Jun. 9, 2020, International Preliminary Report on Patentability issued in the International Patent Application No. PCT/JP2018/044614.

IN-VEHICLE LITHIUM ION BATTERY MEMBER

TECHNICAL FIELD

The present disclosure relates to an in-vehicle lithium ion battery member.

BACKGROUND

Hybrid electric vehicles and electric vehicles have recently becoming widely used, and lithium ion batteries are used as power storage devices for supplying electricity as the power source for such vehicles. In-vehicle lithium ion batteries that can be used in such automobiles are each configured as a battery module having a plurality of cells (e.g., PTL 1). Thus, for in-vehicle lithium ion batteries, reductions in sizes and weights of batteries per se are required for improving the environment in an automobile, as well as for improving their performances as sources of electricity. Accordingly, holding members for installing a plurality of cells or the like into a battery and in-vehicle lithium ion battery members, such as a housing of a battery module, for example, are required to be capable of being formed into complicated shapes, have reduced weights, and the like.

CITATION LIST

Patent Literature

PTL 1: WO 2014/141765

SUMMARY

Technical Problem

In the meantime, since an in-vehicle lithium ion battery may be subjected to vibrations over a long period of time, an important issue for an in-vehicle lithium ion battery member is to securely hold various devices such as battery cells provided in an in-vehicle lithium ion battery or to securely connect and retain structural bodies, together with formation into a complicated shape and weight reduction described above. Specifically, the requirement for an in-vehicle lithium ion battery member is that the in-vehicle lithium ion battery member is not damaged even with large vibrations induced by a driving of an automobile or the like, or in case of an electrolyte solution due to a possible damage to a battery cell. Further, an in-vehicle lithium ion battery member requires secure holding of and connections between various devices and structural bodies. In the case where it is secured to another member with screws, a significant stress continues to remain in the screwed portions. Thus, an in-vehicle lithium ion battery member is susceptible to damage due to a cutting oil or any of various lubrication oils used upon formation of screw holes and screwing, a leaked electrolyte solution, or the like, together with various environmental loads. The in-vehicle lithium ion battery member is required not to be damaged even when a remaining stress continues to be applied under such circumstances.

In view of the above, polyphenylene ether resin compositions (hereinafter, polyphenylene ether may be simply referred to as "PPE") may be used for in-vehicle lithium ion battery members because of their high moldability, high dimensional stability, and low specific gravity.

Conventional PPE resin compositions, however, do not have sufficient resistances to cutting oils and electrolyte solutions and resistances to large vibrations induced by a driving of an automobile or the like, as well as a high moldability, a high dimensional stability, and a low specific gravity at the same time.

Accordingly, an object of the present disclosure is to provide an in-vehicle lithium ion battery member which allows for complication of shape and weight reduction of a molded article, as well as capable of securely holding various devices provided in an in-vehicle lithium ion battery, or securely connecting and retaining structural bodies.

Solution to Problem

[1] An in-vehicle lithium ion battery member produced by molding a resin composition containing (a) a polyphenylene ether resin, the resin composition having a critical strain in a chemical resistance evaluation of 0.5% or more and a Charpy impact strength at 23° C. of 20 kJ/m$^2$ or more.

[2] The in-vehicle lithium ion battery member according to [1], wherein a phase structure having a continuous phase or a sea phase containing the (a) component is formed in a morphology image of the in-vehicle lithium ion battery member.

[3] The in-vehicle lithium ion battery member according to [2], wherein the resin composition for the in-vehicle lithium ion battery member contains (b) a hydrogenated block copolymer in which at least a part of a block copolymer containing at least one polymer block composed primarily of a vinyl aromatic compound and at least one polymer block composed primarily of a conjugated diene compound is hydrogenated and/or a modified product of the hydrogenated block copolymer; and does not substantially contain (c) an olefinic polymer constituted from an olefin, a network-like phase structure having a continuous phase containing the (a) component and linear dispersed phases containing the (b) component and present in the continuous phase is formed in the morphology image of the in-vehicle lithium ion battery member, and in a first processed image obtained through a binarization of the morphology image, a number per unit area of first black portions that are black after the binarization and have an area of $4.92 \times 10^{-4}$ μm$^2$ or more is 30/μm$^2$ or more, and in a case where AW1 (μm$^2$/μm$^2$) represents an occupied area per unit area by first white portions that are white after the binarization, and L1 (μm/μm$^2$) represents a length per unit area of a total peripheral length which is a sum of peripheral lengths of first non-small portions having an area of $15 \times 10^{-4}$ μm$^2$ or more among the first black portions, the length L1 relative to the occupied area AW1 (L1/AW1) is 25 μm$^{-1}$ or more.

[4] The in-vehicle lithium ion battery member according to [3], wherein a number per unit area of first small to medium portions having an area of $4.92 \times 10^{-4}$ to $100 \times 10^{-4}$ μm$^2$ among the first black portions is 25/μm$^2$ or more.

[5] The in-vehicle lithium ion battery member according to [2], wherein the resin composition for the in-vehicle lithium ion battery member contains the (c) olefinic polymer constituted from an olefin, a sea-island phase structure having a sea phase containing the (a) component and island phases containing the (c)

component and present in the sea phase is formed in a morphology image of the in-vehicle lithium ion battery member, and in a second processed image obtained through a binarization of the morphology image, a number per unit area of second black portions that are black after the binarization and have an area of $4.92 \times 10^{-4}$ µm$^2$ or more is 8/µm$^2$ or more, and in a case where AW2 (µm$^2$/µm$^2$) represents an occupied area per unit area by second white portions that are white after the binarization, and L2 (µm/µm$^2$) represents a length per unit area of a total peripheral length which is a sum of peripheral lengths of second non-small portions having an area of $15 \times 10^{-4}$ µm$^2$ or more among the second black portions, the length L2 relative to the occupied area AW2 (L2/AW2) is 7 µm$^{-1}$ or more.

[6] The in-vehicle lithium ion battery member according to [5], wherein a number per unit area of second small to medium portions having an area of $4.92 \times 10^{-4}$ to $100 \times 10^{-4}$ µm$^2$ among the second black portions is 6/µm$^2$ or more.

[7] The in-vehicle lithium ion battery member according to [5] or [6], wherein the resin composition for the in-vehicle lithium ion battery member contains (b) the hydrogenated block copolymer in which at least a part of a block copolymer containing at least one polymer block composed primarily of a vinyl aromatic compound and at least one polymer block composed primarily of a conjugated diene compound is hydrogenated and/or a modified product of the hydrogenated block copolymer.

[8] The in-vehicle lithium ion battery member according to any one of [1] to [7], wherein a flammability level of the resin composition for the in-vehicle lithium ion battery member measured based on a UL94 vertical flame test is V-0.

[9] The in-vehicle lithium ion battery member according to any one of [1] to [8], further containing (d) a phosphate ester compound.

[10] The in-vehicle lithium ion battery member according to any one of [1] to [9], further comprising (e) a phosphinate, and wherein the (e) component contains at least one phosphinate selected from the group consisting of:

a phosphinate represented by the following general formula (1)

[Chemical Formula 1]

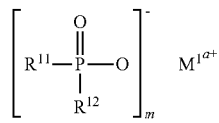

(1)

[in formula (1), R$^{11}$ and R$^{12}$ are each independently a linear or branched alkyl group having a carbon number of 1 to 6 and/or an aryl group having a carbon number of 6 to 10; M$^1$ is at least one selected from the group consisting of a calcium ion, a magnesium ion, an aluminum ion, a zinc ion, a bismuth ion, a manganese ion, a sodium ion, a potassium ion, and a protonated nitrogenous base; a is an integer of 1 to 3; m is an integer of 1 to 3; and a=m]; and a diphosphinate represented by the following formula (2)

[Chemical Formula 2]

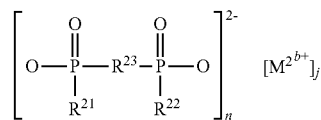

(2)

[in formula (2), R$^{21}$ and R$^{22}$ are each independently a linear or branched alkyl group having a carbon number of 1 to 6 and/or an aryl group having a carbon number of 6 to 10; R$^{23}$ is a linear or branched alkylene group having a carbon number of 1 to 10, an arylene group having a carbon number of 6 to 10, an alkylarylene group having a carbon number of 6 to 10, or an arylalkylene group having a carbon number of 6 to 10; M$^2$ is at least one selected from the group consisting of a calcium ion, a magnesium ion, an aluminum ion, a zinc ion, a bismuth ion, a manganese ion, a sodium ion, a potassium ion, and a protonated nitrogenous base; b is an integer of 1 to 3; n is an integer of 1 to 3; j is an integer of 1 or 2; and b×j=2n].

Advantageous Effect

According to the present disclosure, an in-vehicle lithium ion battery member can be provided, which allows for complication of shape and weight reduction of a molded article, as well as capable of securely holding various devices provided in an in-vehicle lithium ion battery, or securely connecting and retaining structural bodies.

DETAILED DESCRIPTION

Figure 1A:
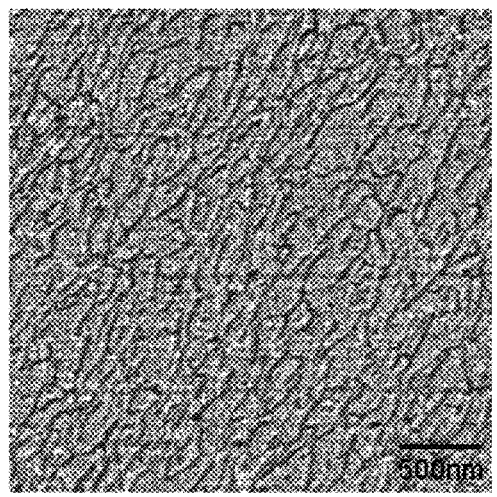
FIG. 1A illustrates a part of an image obtained by observing an in-vehicle LiB member in Example 1 under an SEM (field size: 3×3 µm), in which formation of a network-like phase structure is indicated.

The following provides a detailed description of an embodiment of this disclosure (hereinafter, referred to as the "present embodiment"). However, this disclosure is not limited to the following embodiment and may be implemented with various alterations that are within the essential scope thereof.

[In-Vehicle Lithium Ion Battery Member]

An in-vehicle lithium ion battery member according to the present embodiment (hereinafter, an in-vehicle lithium ion battery member is also referred to as the "in-vehicle LiB member") is produced by molding a resin composition containing (a) a polyphenylene ether resin, wherein the critical strain of the resin composition in a chemical resistance evaluation is 0.5% or more, and the Charpy impact strength of the resin composition is 20 kJ/m² or more at 23° C.

Since the in-vehicle LiB member is produced by molding a resin composition containing the (a) PPE resin, the in-vehicle LiB member obtained from the resin composition can be molded into a complicated shape and the weight of the in-vehicle LiB member can be reduced.

In addition, since the resin composition for an in-vehicle LiB member has a critical strain in a chemical resistance evaluation of 0.5% or more and a Charpy impact strength at 23° C. of 20 kJ/m² or more, the in-vehicle LiB member is capable of securely holding various devices provided in an in-vehicle lithium ion battery, or securely connecting and retaining structural bodies.

In the present embodiment, the in-vehicle LiB member has a critical strain in a chemical resistance evaluation of 0.5% or more, preferably 0.6% or more, and more preferably 0.7% or more. Further, the in-vehicle LiB member has a Charpy impact strength of 20 kJ/m² or more, preferably 21 kJ/m² or more, and more preferably 22 kJ/m² or more. By setting the critical strain to 0.5% or more and the Charpy impact to 20 kJ/m² or more, damage to the in-vehicle LiB member is prevented when an electrolyte solution leaks, or when a residual cutting oil, electrolyte solution, or the like is spilled over a portions such as screw holes in which a stress remains in the in-vehicle LiB member, and on which vibrations caused by a driving of an automobile are exerted.

Here, in the present embodiment, the critical strain in a chemical resistance evaluation is measured in the following procedure.

Resin composition pellets for an in-vehicle LiB member are fed into a small-sized injection molding machine (product name: IS-100GN manufactured by Toshiba Machine Co., Ltd.), of which the cylinder temperature is set to 280° C., and are molded under conditions of a mold temperature of 70° C., an injection pressure of 75 MPa, an injection time of 20 seconds, and a cooling time of 15 seconds to obtain a flat plate of 120 mm×80 mm×3 mm.

From this flat plate, a test specimen in a strip shape (80 mm×12.5 mm×3 mm) is cut out such that the longitudinal direction thereof extends so as to be perpendicular to the flow direction. Using a jig, the test specimen is mounted on a curved surface of a bending bar having a parabolic shape in a vertical cross section represented by the equation of $y^2=6x$ ($x\geq 0$ and $y\geq 0$) with the x-axis in the horizontal direction and the y-axis in the vertical direction so that there is no gap between the bar and test specimen. In the vertical cross section of the bending bar, the test specimen is placed such that the end of the test specimen to start a measurement is positioned at the point where x=0 and y=0, and the end of the test specimen to terminate the measurement is positioned at the point where x>0 and y>0.

After the test specimen is attached to the bending bar as described above, the test specimen is sprayed with 5-56 (manufactured by Kure Kogyo Co., Ltd.) on the surface thereof and is left to stand under conditions of 23° C. and 50% RH for 48 hours. If a crack occurs on the surface of the test specimen after 48 hours, the critical position where the crack occurs (the position where the value of x becomes the largest in the x-axis direction of the bending bar) is read.

Before reading the critical position where the crack occurs, coordinates of positions on the x-axis of the bending bar are marked as scales on the test specimen which is attached to the bending bar. After the test specimen is removed from the bending bar, the test specimen is observed to determine whether there is a crack of a predetermined size described below. The position of a crack, if any, is read by referring to the marked scales (the critical position is the position corresponding to the x-axis coordinate of the bending bar, but not periphery length of the test specimen).

Note that, a crack in the present disclosure is defined as one found in a size of 200 μm or more in the flow direction when the surface of the test specimen is observed under a microscope such as VHX-5000 (manufactured by Keyence Corporation).

The critical strain is calculated by the following equation from the critical position where the crack occurs and the thickness of the test specimen:

$$\text{(Critical strain)}=d\times 3^{1/2}/\{2\times(3+50.8x)^{3/2}\}\times 100(\%)$$

d: Thickness of the test specimen (mm)
x: Position in the x-axis direction (mm)

Although the test specimen is prepared from resin composition pellets in the above description, a test specimen can also be prepared from an in-vehicle LiB member (molded article) to measure the physical properties.

In the present embodiment, a Charpy impact strength is measured in the following procedure.

Resin composition pellets for an in-vehicle LiB member are dried at 100° C. for 2 hours. A test specimen is prepared according to ISO-15103 from the dried resin composition pellets using the injection molding machine IS-100GN manufactured by Toshiba Machine Co., Ltd. (wherein the cylinder temperature is set to 280° C. and the mold temperature is set to 80° C.). Then, a notch is provided in accordance with ISO-179 to the center of the test specimen to produce a notched Charpy impact test piece. The Charpy impact strength at 23° C. of the notched Charpy impact test piece is measured in accordance with ISO-179 as an impact resistance evaluation.

Although the test specimen is prepared from resin composition pellets in the above description, a test specimen can also be prepared from an in-vehicle LiB member (molded article) to measure the physical properties.

In the present embodiment, the flexural modulus of the in-vehicle LiB member measured in accordance with ISO 178 is preferably 1500 MPa or more, more preferably 1600 MPa or more, and even more preferably 1700 to 3000 MPa. When the flexural modulus is within any of the above-mentioned ranges, the resin composition can be provided with a rigidity that enables adoption to structural components and structural bodies.

A flexural modulus of 1500 MPa or more can be achieved by making adjustments so that a particular morphology described later is achieved.

A test of the flexural modulus may be carried out using a test specimen prepared from palettes of the resin composition, or using a test specimen prepared from an in-vehicle lithium ion battery member (molded article).

In the present embodiment, the flammability level of the resin composition for an in-vehicle lithium ion battery member measured based on a UL94 vertical flame test is preferably V-0.

The measurement is carried out on a resin composition made to a thickness of 3.0 mm. A UL94 vertical flame test can also be carried out on a test specimen prepared from an in-vehicle lithium ion battery member (molded article).

In the present embodiment, the flexural vibration fatigue characteristic (the number of repetitions until failure) of the resin composition for an in-vehicle lithium ion battery member measured in accordance with ASTM D671 Method B is preferably 10,000 times or more, more preferably 20,000 times or more, and even more preferably 30,000 times or more.

The ratio of the number of repetitions under the condition where a chemical agent (cutting oil) adheres to the location where a stress is applied, to the number of repetitions under the condition where no chemical agent adheres (i.e., the retention ratio) is preferably 70 to 100%, more preferably 80 to 100%, and even more preferably 90 to 100%. When the retention ratio is in one of these ranges, the in-vehicle lithium ion battery member becomes capable of securely holding various devices provided in a battery, or securely connecting between structures and retaining the connections in an environment where a chemical agent may adhere.

In the present embodiment, the flexural vibration fatigue characteristic is measured in the following procedure.

Resin composition pellets for an in-vehicle LiB member are fed into the small-sized injection molding machine (product name: IS-100GN manufactured by Toshiba Machine Co., Ltd.), of which the cylinder temperature is set to 280° C., and are molded under conditions of a mold temperature of 70° C. and an injection pressure of 60 MPa to obtain Type A cantilever flexural fatigue test pieces for Method B of ASTM D671. Flexural stresses (repetitive stresses: 25 MPa) that cyclically varies are repeatedly applied to the test piece under the following test conditions in accordance with Method B of ASTM D671 until the test piece is destroyed and the number of repetitions is measured. For each composition, three test pieces are used for each of the condition where no cutting oil is applied and the condition where a cutting oil is applied, and the results are averaged. In the condition where a cutting oil is applied, the cutting oil is applied to one side of a part to undergo vibrations (curved portion not fixed by a jig) of the cantilever flexural fatigue test piece, and left to stand under the condition of 23° C. and 50 RH % for 3 hours before performing the test.

Tester: Repeated flexural vibration fatigue tester B-70 manufactured by Toyo Seiki Seisaku-sho, Ltd.
Repetition frequency: 30 Hz (repeating rate: 1800 times/minute)
Measurement temperature: room temperature (23° C.)
Repetitive stress: 25 MPa
Cutting oil: Honilo 988 (manufactured by Castrol)

Although the test piece is prepared from resin composition pellets in the above description, a test piece can also be prepared from an in-vehicle LiB member (molded article) to measure the physical properties.

Note that the in-vehicle LiB member is, but not limited to, a power storage device such as one for a hybrid electric vehicle or an electric vehicle (including a motorcycle), and may be a holding member for holding, in an in-vehicle lithium ion battery module having a plurality of battery cells, a battery cell, other device constituting the battery module, or the like, or may be a member constituting a container of the module such as a housing, a lid, and a frame, for example. Examples of the holding member for holding a battery cell include a cell holder; and a separator, a spacer, and the like used for a battery cell that is required to be secured to a main body. The in-vehicle LiB member is preferably a holding member for holding a battery cell, other device constituting a battery module, or the like in the module, and more preferably is a holding member for holding a battery cell.

Here, the in-vehicle LiB member according to the present embodiment is preferably an in-vehicle LiB member having a phase structure having a continuous phase or a sea phase which contains the (a) component in a morphology image described later, particularly an in-vehicle LiB member having a morphology described in a first modification or a second modification described below, from the viewpoint of achieving the critical strain in a predetermined chemical resistance evaluation and the Charpy impact strength described above.

First Modification to Present Embodiment

An in-vehicle LiB member according to a first modification to the present embodiment contains (b) a hydrogenated block copolymer in which at least a part of a block copolymer containing at least one polymer block composed primarily of a vinyl aromatic compound and at least one polymer block composed primarily of a conjugated diene compound is hydrogenated and/or a modified product of the hydrogenated block copolymer, and does not substantially contain (c) an olefinic polymer constituted from an olefin, and has the following network-like phase structure in a morphology image.

Specifically, the in-vehicle LiB member of the first modification exhibits a network-like phase structure in a morphology image obtained by staining a cross section of the in-vehicle LiB member with ruthenium tetroxide and observing the cross section under an SEM (scanning electron microscope). Usually, certain parts in the polymer chain are stained by ruthenium tetroxide, and are observed to be relatively white in a morphology image. Thus, in the in-vehicle LiB member of the first modification, as depicted in FIG. 1A, a network-like phase structure is formed which has a continuous phase containing the (a) component which is observed to be relatively white (gray), and linear dispersed phases containing the (b) component which are observed to be relatively black in the continuous phase in a morphology image observed under a predetermined condition described later. Each dispersed phase corresponding to a part of the network in the network-like phase structure has an elongated structure, and is a domain formed by bending or branching which is bent or curved into an arc, or is forked into two or more branches or has sequential connections. In the morphology image, the linear dispersed phases do not necessarily extend continuously to form a network-like phase structure, and intermittent parts may be present.

Figure 1B:
FIG. 1B is a binarized image of the image in FIG. 1A.

Further, in the in-vehicle LiB member of the first modification, in a first processed image (see FIG. 1B, for example) which is obtained through a binarization of a morphology image according to a predetermined condition described later, to color relatively white (gray) portions and relatively black portions in the morphology image with white and black, respectively, the number per unit area (1 $\mu m^2$) of first black portions that are black after the binarization and have an area of $4.92 \times 10^{-4}$ $\mu m^2$ or more is preferably 30/$\mu m^2$ or more. Further, in the in-vehicle LiB member of the first modification, in the case where AW1 ($\mu m^2/\mu m^2$) represents the occupied area per unit area (1 $\mu m^2$) by first white portions that are white after the binarization, and L1 ($\mu m/\mu m^2$) represents a length per unit area (1 $\mu m^2$) of a total peripheral length which is a sum of peripheral lengths of first non-small portions having an area of $15 \times 10^{-4}$ $\mu m^2$ or more among the first black portions, the length L1 relative to the occupied area AW1 (L1/AW1) is preferably 25 $\mu m^{-1}$ or more.

In other words, in the in-vehicle LiB member of the first modification, a certain number of dispersed phases (first black portions having an area of $4.92 \times 10^{-4}$ $\mu m^2$ or more) excluding dispersed phases which are too small are dispersed in the morphology. Further, in the first processed image, the total length of peripheral lengths (the length of boundaries between white portions and black portions) per unit area (1 μm$^2$) of first non-small portions (having an area of 15×10$^{-4}$ μm$^2$ or more) which are first black portions in sizes as large as a certain degree, relative to the occupied area per unit area (1 μm$^2$) by the first white portions, is a predetermined length. Thus, the continuous phase has boundaries in certain lengths with dispersed phases in sizes as large as a certain degree per unit area in the morphology.

In the present embodiment including the first modification and a second modification described below, the area and the periphery length of a portion that is black after a binarization are calculated as follows. Using software described later, the area and the length per pixel is calculated from one pixel in a processed image obtained through a binarization of a morphology image (digital image) taken by a procedure which will be described later, based on an imaging condition of the morphology image. Then, the number of pixels in the portion that is black after the binarization and the number of pixels around the black portion are calculated using the software. The resultant number of pixels is multiplied with the area and the length per pixel. In addition, the number of pixels in each portion that is black after the binarization in the binarized processed image and the number of pixels around the black portion can be obtained using software described later.

Further, in the present embodiment including the first modification and a second modification described below, the occupied area per unit area (1 μm$^2$) (μ$^2$/μm$^2$) by portions that is white after a binarization, the number per unit area (1 μm$^2$) (number/μm$^2$) of portions that are black after the binarization and have a certain area (μm$^2$), and the length per unit area (1 μm$^2$) (μm/μm$^2$) of the total peripheral length of peripheral lengths of portions that are black after the binarization and have a certain area (μm$^2$) refer to the values determined by calculating areas of portions that are white (μm$^2$), the number of portions that are black and have a certain area (μm$^2$), and the total peripheral length of peripheral lengths of the portions that are black and have a certain area (μm$^2$), respectively, for five points having a certain area (9 μm$^2$ or 25 μm$^2$) in a processed image obtained through a binarization of a morphology image; determining the respective averages by summing the areas (μm$^2$), the numbers, and the total peripheral lengths obtained at the five image portions; and dividing the respective averages by the certain area. Note that the certain area is chosen from 9 μm$^2$ or 25 μm$^2$ since calculation of the number or the like of the first black portions in a point having an area of 9 μm$^2$ becomes cumbersome and thus calculation on a point having an area of 25 μm$^2$ is appropriate in the case where dispersed phases are generally large, for example.

In the present embodiment, morphology images of the in-vehicle LiB members of the first modification and the second modification described later, and first and second processed images can be obtained in the following procedures.

First, a measurement cross section is prepared from a piece of the core portion (center portion in the thickness direction) of an in-vehicle LiB member using an ultramicrotome. Specifically, the "core portion" refers to a center portion of the in-vehicle LiB member located at least 1 μm from the surface layer in the thickness direction, which is less susceptible to the injection rate during injection molding. After the measurement cross section is stained with ruthenium tetroxide, an image of the measurement cross section is taken under HITACHI SU-8220 (manufactured by Hitachi High-Tech Fielding Corporation) with settings of an imaging magnification of 10,000 times, an acceleration voltage of 1.0 kV, and a detector: secondary electrons (UPPER: LA). A digitalized SEM image of the cross section is obtained (number of pixels: 1280×960), to thereby obtain a morphology image of the in-vehicle LiB member of the present embodiment.

Next, the obtained morphology image is binarized in the following procedure using image processing software imageJ (version 1.50i).

First, the morphology image is opened, and an area to be binarized (pixels in number corresponding to a 3-μm square or a 5-μm square) is selected. The selected image is smoothed using the median filter of the image processing software ImageJ and is binarized using a threshold to obtain a first or second processed image. Upon the binarization, the default binarization algorithm and the auto threshold are used.

In the first or second processed image obtained as described above, all of portions that are black after the binarization are extracted by "Analyze Particles" command of the image processing software imageJ. The number per unit area of the first or second black portions (number/μm$^2$), the total peripheral length of the peripheral lengths of the first or second non-small portions (μm/μm$^2$), or the like can be determined by calculating the number of pixels in the portions per se and the number of pixels surrounding the portions. Further, by extracting all of portions that are white after a binarization and calculating the number of pixels in these portions, the occupied area by the first or second white portions per unit area (μm$^2$/μm$^2$), or the like can be obtained.

In the present embodiment, five sets of first and second processed images are generated from one in-vehicle LiB member. Average values obtained by averaging the respective measurement values obtained from the respective five images are used as measurement results.

It should be noted that defects (e.g., scratches occurred when the cross section was prepared using an ultramicrotome, voids inherent in a resin, etc.) in a measurement cross section and the like may be included in a morphology image. In such a case, the image area to be binarized is selected so as not to include such defects. In addition, a portion that is black after a binarization may be cut off at an edge of a binarized image. Although the length of the edge of the image is inevitably included as a part of the circumferential length of that portion in such a case, the inclusion of the length of the edge can be ignored as an error.

Further, in the present embodiment, upon binarizing each morphology image, since there is a possibility of too small island phases or noises, the pixels of 2×2 are cut off.

Advantages and effects of the in-vehicle LiB member of the first modification will be described below.

In the in-vehicle LiB member of the first modification, since the (b) component is contained in the in-vehicle LiB member, the in-vehicle LiB member includes the component contributing to the chemical resistance and the impact resistance. As a result, the chemical resistance and the impact resistance are improved as compared with a case where only the (a) component is included.

In addition, when the number of first black portions is 30/μm$^2$ or more and the length L1 of the total periphery lengths of first non-small portions per unit area (1 μm$^2$) relative to the occupied area AW1 by first white portions per unit area (1 μm$^2$) (L1/AW1) is 25 μm$^{-1}$ or more in the first processed image, formation of an effective network-like structure can be induced in a state where the dispersed phases are mixed not excessively uniformly in the continuous phase in the morphology of the LiB member of the first modification.

Specifically, when the number of first black portions is $30/\mu m^2$ or more, dispersed phases that are not too small are present at a moderate degree of dispersion per unit area in the morphology. As a result, an external force exerted on the continuous phase (having a relatively low impact resistance) is mitigated by the dispersed phases (having relatively high impact resistances) that are dispersed apart from each other at moderate distances, which improves the impact resistance of the in-vehicle LiB member as a whole. Note that the case wherein the number reduce to less than $30/\mu m^2$ occurs when the content of the (b) component is relatively small relative to the (a) component, etc., and improvements in the chemical resistance and the impact resistance tends to be difficult in such a case.

Further, in the case where the length L1 of the total periphery lengths of first non-small portions per unit area relative to the occupied area AW1 by first white portions per unit area (L1/AW1) is 25 $\mu m^{-1}$ or more, the first white portions are bordered with first non-small portions having certain lengths per unit area. Thus, the dispersed phases (having relatively high chemical resistances) extend into the continuous phase (having a relatively lower chemical resistance) while coming into contact with the continuous phase to a large extent. Thus, the dispersed phases can be present so as to encapsulate the continuous phase to thereby improve the chemical resistance, and the dispersed phases may prevent an extension of a crack possibly induced by a chemical agent in the continuous phase. The reason why the first non-small portions are defined as first black portions having an area of $15 \times 10^{-4}$ $m^2$ or more is that there is a tendency that dispersed phases having relatively small areas cannot be present so as to encapsulate the continuous phase or cannot prevent an extension of a crack possibly induced by a chemical agent in the continuous phase. Further, the case where the length L1 of the total periphery lengths of first non-small portions per unit area relative to the occupied area AW1 by first white portions per unit area (L1/AW1) of less than 25 $\mu m^{-1}$ may occur when the (a) component and the (b) component are melt-kneaded excessively in melt-kneading in a production process of an in-vehicle LiB member. In this case, dispersed phases may be finely dispersed in the continuous phase, and the network-like phase structure may be destroyed, which makes an improvement in the chemical resistance insufficient.

Accordingly, in the in-vehicle LiB member of the first modification, an effective network-like phase structure is formed by a large number of dispersed phases having elongated and bent shapes in sizes as large as a certain degree, and a large number of dispersed phases dispersed to a degree not too fine. As a result, the chemical resistance and the impact resistance can be effectively improved, and a predetermined critical strain in a chemical resistance evaluation and a predetermined Charpy impact strength can be suitably satisfied.

If the (b) component is excessively mixed with the (a) component in melt-kneading of the (a) component and the (b) component, dispersed phases would be finely dispersed in the morphology of the in-vehicle LiB member. In this state, the number of black portions having areas less than $4.92 \times 10^{-4}$ $\mu m^2$ tends to increase excessively or the number of first non-small portions tends to decrease thereby causing a decrease in the total periphery length thereof, which tends to reduce the chemical resistance and the impact resistance.

Here, in the first modification, the number of first black portions is preferably $30/\mu m^2$ or more, more preferably $32.5/\mu m^2$ or more, and even more preferably $35/\mu m^2$ or more. Further, the length L1 of the total periphery lengths of first non-small portions per unit area (1 $\mu m^2$) relative to the occupied area AW1 by first white portions per unit area (1 $\mu m^2$) (L1/AW1) is preferably 25 $\mu m^{-1}$ or more, more preferably 26 $\mu m^{-1}$ or more, and even more preferably 27 $\mu m^{-1}$ or more. This makes it possible to more suitably satisfy a predetermined critical strain in a chemical resistance evaluation and a predetermined Charpy impact strength.

Further, the number of first black portions is preferably $50/\mu m^2$ or less. The case where the number exceeds $50/\mu m^2$ may occur when the content of the (b) component is relatively large relative to the content of the (a) component, etc. In this case, improvement in the moldability of an in-vehicle LiB member and a weight reduction tends to be difficult. Further, the length L1 of the total periphery lengths of first non-small portions per unit area (1 $\mu m^2$) relative to the occupied area AW1 by first white portions per unit area (1 $\mu m^2$) (L1/AW1) is preferably 50 $\mu m^{-1}$ or less. The case where L1/AW1 exceeds 50 $\mu m^{-1}$ may occur when the content of the (b) component is relatively large relative to the content of the (a) component, and the moldability, the dimension stability, and a low specific gravity derived from the (a) component may not be achieved sufficiently.

In the in-vehicle LiB member of the first modification, the number per unit area of first small to medium portions having areas of $4.92 \times 10^{-4}$ to $100 \times 10^{-4}$ $\mu m^2$ among the first black portions is preferably $25/\mu m^2$ or more, more preferably $26/\mu m^2$ or more, and even more preferably $27/\mu m^2$ or more. This ensures that dispersed phases having appropriate sizes are present at an appropriate degree of dispersion within a unit area in the morphology, so that a predetermined Charpy impact strength can be more suitably satisfied.

Further, the number per unit area of first small to medium portions having areas of $4.92 \times 10^{-4}$ to $100 \times 10^{-4}$ $\mu m^2$ among the first black portions is preferably $50/\mu m^2$ or less.

In the in-vehicle LiB member of the first modification, the occupied area per unit area of the first black portions having areas $4.92 \times 10^{-4}$ or more is 0.10 to 0.50 $\mu m^2/\mu m^2$, more preferably 0.15 to 0.45 $\mu m^2/\mu m^2$, and even more preferably 0.20 to 0.40 $\mu m^2/\mu m^2$. Since a more effective network shape can be formed in which the dispersed phases are mixed with the continuous phase not too uniformly, a predetermined critical strain in a chemical resistance evaluation and a predetermined Charpy impact strength can be more suitably satisfied.

The lengths of black portions in the first processed image are preferably 0.1 to 10.0 $\mu m$ and more preferably 0.1 to 5.0 $\mu m$, from the viewpoint of achieving further excellent chemical resistance and impact resistance.

In addition, the widths of the black portions are preferably 0.01 to 1.0 $\mu m$ and more preferably 0.02 to 0.5 $\mu m$, from the viewpoint of achieving further excellent chemical resistance and impact resistance.

The aspect ratios of the black portions are preferably from 5 to 1000 and more preferably from 10 to 500, from the viewpoint of achieving further excellent chemical resistance and impact resistance.

The maximum distance between black portions is preferably 0.005 to 0.2 $\mu m$ and more preferably 0.01 to 0.15 $\mu m$, from the viewpoint of achieving further excellent chemical resistance and impact resistance. The maximum distance between black portions in the first processed image refers to the maximum distance between black portions of arbitrary 100 black portions observed in a first processed image of an arbitrary cross section of the in-vehicle LiB member.

In the in-vehicle LiB member of the first modification, the content of the (a) component is preferably 60 to 90% by mass, more preferably 63 to 87% by mass, and even more preferably 66 to 84% by mass, with respect to 100% by mass of the total amount of the (a) component and the (b) component. Further, the content of the (b) component is preferably 10 to 40% by mass, more preferably 13 to 37% by mass, and even more preferably 16 to 34% by mass, with respect to 100% by mass of the total amount of the (a) component and the (b) component. By setting the amounts of the (a) component and the (b) component in one of the above ranges, the number of first black portions and the number of first non-small portions in the first processed image can be made to fall within predetermined ranges.

Further, the in-vehicle LiB member of the first modification does not substantially contain (c) an olefinic polymer constituted from an olefin. The term "not substantially contain" as used herein means that the content is 2% by mass or less, more preferably 1% by mass or less, and even more preferably 0.5% by mass or less, with respect to 100% by mass of the composition constituting the in-vehicle LiB member, and it is particularly preferable that no (c) component is contained (details of the (c) component will be described in the second modification described later).

Further, in the in-vehicle LiB member of the first modification, the total content of the (a) component and the (b) component is preferably 70% by mass or more, more preferably 80% by mass or more, even more preferably 90% by mass or more, and particularly preferably 95% by mass or more, with respect to 100% by mass of the resin components in the composition constituting the in-vehicle LiB member. When a resin component compatible with the (a) component is contained in the composition constituting the in-vehicle LiB member, the total content of the (a) component and the (b) component is preferably 90% by mass or more, more preferably 95% by mass or more, even more preferably 97% by mass or more, and particularly preferably 99% by mass or more, with respect to 100% by mass of resin components in the composition constituting the in-vehicle LiB member.

Further, in the in-vehicle LiB member of the first modification, the total content of the (a) component and the (b) component is preferably 50% by mass or more, more preferably 60% by mass or more, even more preferably 70% by mass or more, and particularly preferably 80% by mass or more, with respect to 100% by mass of the composition constituting the in-vehicle LiB member.

(a) Component

The (a) polyphenylene ether resin used in the first modification may be, but is not particularly limited to, a polyphenylene ether, a modified polyphenylene ether, or a mixture of both. One (a) component may be used alone or two or more (a) components may be used in combination.

The reduced viscosity of the (a) component is preferably 0.25 dL/g or more and more preferably 0.28 dL/g or more, and is preferably 0.60 dL/g or less, more preferably 0.57 dL/g or less, and particularly preferably 0.55 dL/g or less, in view of further improving the flame retardancy of the in-vehicle LiB member. The reduced viscosity may be controlled via the polymerization time and the catalyst amount.

Note that the reduced viscosity can be measured with an Ubbelohde viscosity tube by using a chloroform solution with $\eta_{sp}/c$ of 0.5 g/dL under the condition of a temperature of 30° C.

Polyphenylene Ether

The polyphenylene ether may be, but is not particularly limited to, a homopolymer formed from a repeating unit structure represented by the following formula (3) and/or a copolymer including a repeating unit structure represented by the following formula (3):

[Chemical Formula 3]

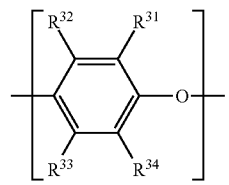

(3)

[in the formula, $R^{31}$, $R^{32}$, $R^{33}$, and $R^{34}$ are each independently a monovalent group selected from the group consisting of a hydrogen atom, a halogen atom, a primary alkyl group having a carbon atom number of 1 to 7, a secondary alkyl group having a carbon atom number of 1 to 7, a phenyl group, a haloalkyl group, an aminoalkyl group, an oxyhydrocarbon group, and an oxyhalohydrocarbon group in which a halogen atom and an oxygen atom are separated by at least two carbon atoms.]

Commonly known examples can be used as the polyphenylene ether without any specific limitations. Specific examples of the polyphenylene ether include homopolymers such as poly(2,6-dimethyl-1,4-phenylene ether), poly (2-methyl-6-ethyl-1,4-phenylene ether), poly (2-methyl-6-phenyl-1,4-phenylene ether), and poly (2,6-dichloro-1,4-phenylene ether); and copolymers such as copolymers of 2,6-dimethyl phenol and other phenols (e.g., 2,3,6-trimethyl phenol and 2-methyl-6-butyl phenol), for example. Of these, poly(2,6-dimethyl-1,4-phenylene ether) and copolymers of 2,6-dimethyl phenol and 2,3,6-trimethyl phenol are preferable, and poly(2,6-dimethyl-1,4-phenylene ether) is more preferable.

The method by which the polyphenylene ether is produced is not specifically limited and may be a conventional and commonly known method. Specific examples of polyphenylene ether production methods that can be used include a method described in U.S. Pat. No. 3,306,874A in which a polyphenylene ether is produced through oxidative polymerization of 2,6-xylenol, for example, using a complex of a cuprous salt and an amine as a catalyst, and methods described in U.S. Pat. Nos. 3,306,875A, 3,257,357A, and 3,257,358A, JP S52-17880B, JP S50-51197A, and JP S63-152628A.

Modified Polyphenylene Ether

Examples of the modified polyphenylene ether include, but are not particularly limited to, those obtained by grafting and/or adding styrene polymers and/or derivatives thereof to the aforementioned polyphenylene ether. The ratio of mass increase by the grafting and/or addition is, but not particularly limited to, preferably 0.01% by mass or more; and is preferably 10% by mass or less, more preferably 7% by mass or less, and even more preferably 5% by mass or less, per 100% by mass of the modified polyphenylene ether.

The method of preparing the modified polyphenylene ether is not particularly limited, and may be a method in which the aforementioned polyphenylene ether is reacted with a styrene polymer and/or its derivative, in the presence or absence of a radical precursor, in a molten state, solution state, or slurry state, under the condition of 80 to 350° C.

In the case where the (a) component is a mixture of a polyphenylene ether and a modified polyphenylene ether, the mixing ratio of the polyphenylene ether and the modified polyphenylene ether is not particularly limited and may be any ratio.

(b) Component

The (b) component used in the first modification is a hydrogenated block copolymer in which at least a part of a block copolymer containing at least one polymer block composed primarily of a vinyl aromatic compound and at least one polymer block composed primarily of a conjugated diene compound is hydrogenated and/or a modified product of the hydrogenated block copolymer. More specifically, examples of the (b) component used in the first modification include, but are not particularly limited to, a hydrogenated block copolymer (an unmodified hydrogenated block copolymer), a modified product of a hydrogenated block copolymer (modified hydrogenated block copolymer), and a mixture of both. One (b) component may be used alone or two or more (b) components may be used in combination.

Hereinafter, a polymer block composed primarily of a vinyl aromatic compound is also referred to as a polymer block A, and a polymer block composed primarily of a conjugated diene compound is also referred to as a polymer block B.

Polymer Block A

Examples of the polymer block A composed primarily of a vinyl aromatic compound include homopolymer blocks of vinyl aromatic compounds, and copolymer blocks of vinyl aromatic compounds and conjugated diene compounds. Of these, preferred are homopolymer blocks of vinyl aromatic compounds, and copolymer blocks of vinyl aromatic compounds and conjugated diene compounds containing more than 50% by mass (preferably 70% by mass or more) of the vinyl aromatic compound units.

Here, the term "polymer block A 'composed primarily of a vinyl aromatic compound'" means that vinyl aromatic compound units are contained in the polymer block A prior to hydrogenation in an amount of more than 50% by mass, and the vinyl aromatic compound units are contained in an amount of preferably 70% by mass or more, and more preferably 80% by mass or more. Further, the amount of vinyl aromatic compound units in the polymer block A prior to hydrogenation may be 100% by mass or less.

Examples of the vinyl aromatic compounds include, but are not particularly limited to, styrene, α-methyl styrene, vinyl toluene, p-tert-butylstylene, and diphenylethylene. Of these, styrene is preferable.

Examples of the conjugated diene compound include conjugated diene compounds described below, and butadiene, isoprene, and a combination of these are preferable.

They may be used alone or in a combination of two or more.

In the polymer block A, the distribution of vinyl aromatic compounds, conjugated diene compounds, and the like, in the molecular chain of in the polymer block may be a random distribution, a tapered distribution (i.e., a distribution in which monomer portions increase or decrease along the molecular chain), a partial block distribution, or a combination of these distributions.

In the case in which the (b) component includes two or more polymer blocks A, the polymer blocks A may each have the same structure or may have different structures. Further, in the case in which a combination of two or more (b) components is used, the polymer block A in each (b) component may be the same or different.

The number average molecular weight (Mn) of the polymer block A is preferably 5,000 or more, more preferably 10,000 or more, and even more preferably 15,000 or more, from the viewpoint of achieving further excellent chemical resistance and impact resistance. In addition, from the same viewpoint, it is preferably 100,000 or less, more preferably 70,000 or less, and even more preferably 50,000 or less.

Polymer Block B

Examples of the polymer block B composed primarily of a conjugated diene compound include homopolymer blocks of conjugated diene compounds, and random copolymer blocks of conjugated diene compounds and vinyl aromatic compounds. Of these, preferred are homopolymer blocks of conjugated diene compounds, and copolymer blocks of conjugated diene compounds and vinyl aromatic compounds containing more than 50% by mass (preferably 70% by mass or more) of the conjugated diene compound units.

Here, the term "polymer block B 'composed primarily of a conjugated diene compound'" means that conjugated diene compound units are contained in the polymer block B in an amount of more than 50% by mass, and the conjugated diene compound units are contained in an amount of preferably 70% by mass or more, and more preferably 80% by mass or more in view of enhancing the fluidity of the resin composition, and the amount may be 100% by mass or less.

Examples of the conjugated diene compounds include, but are not particularly limited to, butadiene, isoprene, 1,3-pentadiene, and 2,3-dimethyl-1,3-butadiene, for example. Of these, butadiene, isoprene, and a combination thereof are preferable.

Examples of the vinyl aromatic compounds include the vinyl aromatic compounds described above, and styrene is preferable.

They may be used alone or in a combination of two or more.

In the polymer block B, the distribution of conjugated diene compounds, vinyl aromatic compounds, and the like, in the molecular chain of in the polymer block may be a random distribution, a tapered distribution (i.e., a distribution in which monomer portions increase or decrease along the molecular chain), a partial block distribution, or a combination of these distributions.

In the case in which the (b) component includes two or more polymer blocks B, the polymer blocks B may each have the same structure or may have different structures. Further, in the case in which a combination of two or more (b) components is used, the polymer block B in each (b) component and the polymer block B in the (b-2) component may be the same or different.

The hydrogenation ratio of ethylenic double bonds in the conjugated diene compound unit in the polymer block B is preferably 20% or more from the viewpoint of achieving good chemical resistance and impact resistance. The hydrogenation rate can be measured using a nuclear magnetic resonance (NMR) spectrometer.

The proportion of sum of 1,2-vinyl bonds and 3,4-vinyl bonds relative to ethylenic double bonds in a conjugated diene compound unit in the polymer block B is preferably 25 to 90% and more preferably 30 to 80%, from the viewpoint of achieving further excellent chemical resistance and impact resistance.

As used herein, the "sum of the 1,2-vinyl bonding amount and the 3,4-vinyl bonding amount (total vinyl bonding amount)" refers to the proportion of the sum of the 1,2-vinyl bonding amount and the 3,4-vinyl bonding amount in a conjugated diene compound unit in a polymer block containing a conjugated diene compound prior to hydrogenation, relative to the sum of the 1,2-vinyl bonding amount, the 3,4-vinyl bonding amount, and the 1,4-conjugated bonding amount. The total vinyl bonding amount can be determined through measurement using an infrared spectrophotometer and calculation in accordance with the method described in Analytical Chemistry, Volume 21, No. 8, August 1949.

The number average molecular weight (Mn) of the polymer block B is preferably 20,000 or more, more preferably 30,000 or more, and even more preferably 40,000 or more, from the viewpoint of achieving further excellent chemical resistance and impact resistance. The number average molecular weight (Mn) is preferably 100,000 or less and more preferably 80,000.

The glass transition temperature of the polymer block B after hydrogenation is preferably 0° C. or less and more preferably −10° C. or less, from the viewpoint of achieving further excellent chemical resistance and impact resistance.

Note that the glass transition temperature of a block copolymer and the glass transition temperature of polymer blocks in a block copolymer can be measured by a dynamic viscoelasticity measurement apparatus using a sample processed into a film, under the condition of the tension mode, a temperature scan speed of 3° C./minute, a frequency of 1 Hz, and a nitrogen atmosphere.

Structure of Hydrogenated Block Copolymer

Examples of the structures of the hydrogenated block copolymers in the (b) component include structures such as A-B, A-B-A, B-A-B-A, (A-B-)$_n$-X (where n is an integer of 1 or more, and X is a reaction residue of a polyfunctional coupling agent such as silicon tetrachloride and tin tetrachloride, or a residue of an initiator such as a polyfunctional organolithium compound), and A-B-A-B-A, where "A" represents the polymer block A and "B" represents the polymer block B.

Further, in the (b) component, the hydrogenated block copolymer contains preferably a hydrogenated block copolymer in which the number of polymer blocks A is two, more preferably a hydrogenated block copolymer in which the number of polymer blocks A is two and the number of polymer blocks B is one in its structure.

Furthermore, with regard to the block structure, preferably, the polymer block B is a homopolymer block of a conjugated diene compound, or a copolymer block of a conjugated diene compound and a vinyl aromatic compound containing more than 50% by mass (preferably 70% by mass or more) of the conjugated diene compound unit, and the polymer block A is a homopolymer block of a vinyl aromatic compound, or a copolymer block of a vinyl aromatic compound and a conjugated diene compound containing more than 50% by mass (preferably 70% by mass or more) of the vinyl aromatic compound.

Note that the (b) component may include a block other than the polymer block A and the polymer block B.

The molecular structure of the hydrogenated block copolymer in the (b) component may be linear, branched, radial, or combinations thereof, without being limited thereto.

Content of Vinyl Aromatic Compound Unit

The content of a vinyl aromatic compound unit in the (b) component (hydrogenated block copolymer constitutional unit derived from a vinyl aromatic compound) before hydrogenation is, but not particularly limited to, preferably 10 to 70% by mass, more preferably 20 to 70% by mass, even more preferably 20 to 60% by mass, and still even more preferably 30 to 50% by mass, in view of the heat resistance and the mechanical strength of the in-vehicle LiB member.

In addition to the (b) component being one (b) component having the content of the vinyl aromatic compound unit within one of these ranges, a (b) component having two or more different contents of vinyl aromatic compound units may also be used.

Total Vinyl Bonding Amount

The proportion of the sum of 1,2-vinyl bonds and 3,4-vinyl bonds relative to ethylenic double bonds in a conjugated diene compound unit included in the (b) component is preferably 25% or more and 90% or less.

Examples of the method of controlling the proportion of the sum of 1,2-vinyl bonds and 3,4-vinyl bonds within such ranges include, but are not particularly limited to, adding an agent to adjust the 1,2-vinyl bonding amount and adjusting the polymerization temperature during manufacturing of the (b) component, for example.

The term "sum of 1,2-vinyl bonds and 3,4-vinyl bonds relative to double bonds in a conjugated diene compound unit" refers to the sum of 1,2-vinyl bonds and 3,4-vinyl bonds relative to double bonds (ethylenic double bonds) in a conjugated diene compound unit in a block copolymer prior to hydrogenation of the hydrogenated block copolymer. For example, the sum can be determined through measurement of a block copolymer prior to hydrogenation using an infrared spectrophotometer and calculation in accordance with the Hampton method. Alternatively, the sum can also be calculated from a block copolymer after hydrogenation by means of an NMR.

Hydrogenation Ratio

The hydrogenation ratio of ethylenic double bonds in the block copolymer (double bonds in the conjugated diene compound unit) in the (b) component is preferably greater than 0%, more preferably 10% or more, even more preferably 20% or more, and particularly preferably 20% or more, in view of the chemical resistance and the impact resistance. Additionally, the hydrogenation ratio is preferably 100% or less.

The (b) component having such hydrogenation ratios can be readily prepared by controlling the amount of hydrogen consumption within a range of a desired hydrogenation ratio (for example, 10% or more and less than 80%) in a hydrogenated reaction for ethylenic double bonds of a block copolymer, for example.

The hydrogenation ratio can be determined by quantifying the remaining double bonding amount in the polymer block B by means of an NMR measurement, for example.

Number Average Molecular Weight (Mn) of Block Copolymer Prior to Hydrogenation

The number average molecular weight (Mn) of the block copolymer prior to hydrogenation is preferably 5,000 or more, more preferably 10,000 or more, and particularly preferably 30,000 or more, and is preferably 1,000,000 or less, more preferably 800,000 or less, and particularly preferably 500,000 or less.

Case Where Specific Component is Contained as (b) Component

The (b) component preferably contains a (b') component having a molecular weight peak after hydrogenation in terms of the standard polystyrene measured by GPC of 10,000 to 200,000, in view of the impact resistance and the chemical resistance. More preferably, the (b') component has a molecular weight peak of 30,000 to 200,000. Further, the (b) component contains preferably a (b-1) component or a (b-2) component as follows having different molecular weight peaks, and more preferably the (b-1) component and the (b-2) component. The molecular weight peak of the (b-1) component after hydrogenation in terms of the standard polystyrene measured by GPC is 80,000 to 200,000, and is preferably 100,000 to 200,000 in view of the impact resistance and the chemical resistance. In addition, the molecular weight peak of the (b-2) component after hydrogenation in terms of the standard polystyrene measured by GPC is 10,000 or more and less than 80,000, and is preferably 30,000 or more and less than 80,000 in view of the impact resistance and the chemical resistance.

Examples of the method of controlling the molecular weight peaks of the (b) component within such ranges include, but are not particularly limited to, adjusting the amount of a catalyst in a polymerization step, for example.

In the present specification, the molecular weight peaks can be measured using the gel permeation chromatography apparatus System 21 manufactured by Showa Denko K. K. under the following conditions: (columns: one K-G, one K-800RL, and one K-800R, manufactured by Showa Denko K. K., connected in series; column temperature: 40° C.; solvent: chloroform; solvent flow rate: 1.0 mL/min; and sample concentration: 1 g/L chloroform solution of a hydrogenated block copolymer). A calibration curve is plotted using standard polystyrene (standard polystyrene having molecular weights of 3,650,000, 2,170,000, 1,090,000, 681,000, 204,000, 52,000, 30,200, 13,800, 3,360, 1,300, and 550). Measurements are carried out by setting the ultraviolet (UV) wavelength of a detector to 254 nm for both the standard polystyrene and hydrogenated block copolymers.

In the case where the (b) component has an A-B-A structure, the number average molecular weight (MnbA) of the polymer block A constituting the (b) component can be determined based on the number average molecular weight (Mnb) of the (b) component using the calculation formula: MnbA=(Mnb×ratio of the amount of vinyl aromatic compounds that are bound)/2, assuming that the molecular weight distribution of the (b) component is one and that two polymer blocks A composed primarily of a vinyl aromatic compound have an identical molecular weight, for example. In the case where the sequences of the block structure A and the block structure B are known before a vinyl aromatic compound-conjugated diene compound block copolymer is synthesized, the number average molecular weight may be calculated from the ratio of the block structure A based on the number average molecular weight (Mnb) of the (b) component that has been measured, without using the above calculation formula.

The (b') component, the (b-1) component, and the (b-2) component preferably have the following physical properties from the viewpoint of achieving even further excellent chemical resistance and impact resistance.

More specifically, the (b') component, the (b-1) component, and the (b-2) component each have a number average molecular weight (Mn) of the polymer block A of preferably 5,000 to 25,000 and more preferably from 10,000 to 25,000.

The hydrogenation rate of ethylenic double bonds in the conjugated diene compound unit in the polymer block B is preferably 20% or more and less than 80% and more preferably 20% or more and less than 70%.

The number average molecular weight (Mn) of the polymer block B is preferably from 20,000 to 100,000, more preferably from 20,000 to 90,000, and even more preferably from 20,000 to 80,000.

The glass transition temperature of the polymer block B after hydrogenation is preferably −50° C. or lower, more preferably −60° C. or lower, and even more preferably −70° C. or lower.

The proportion of the sum of 1,2-vinyl bonds and 3,4-vinyl bonds relative to ethylenic double bonds in a conjugated diene compound unit is preferably 25% or more and less than 60%, more preferably 25% or more and 55% or less, and even more preferably 25% or more and 50% or less. Further, the proportion of the sum of 1,2-vinyl bonds and 3,4-vinyl bonds of 25% or more is preferable in view of an improved compatibility with the (b-3) component described below which is optionally included.

The hydrogenation ratio of ethylenic double bonds in the block copolymer (double bonds in the conjugated diene compound unit) is preferably more than 0% and less than 80%, more preferably 10% or more and less than 80%, even more preferably 20% or more and less than 80%, still even more preferably 20 to 70%, and particularly preferably 20% or more and less than 70%.

The content of the vinyl aromatic compound unit prior to hydrogenation (hydrogenated block copolymer constitutional unit derived from a vinyl aromatic compound) is preferably 10 to 70% by mass, more preferably 20 to 70% by mass, even more preferably 20 to 60% by mass, still even more preferably 30 to 50% by mass, and particularly preferably 30 to 40% by mass.

The molecular weight distribution (Mw/Mn) prior to hydrogenation is preferably 1.01 to 1.50 and more preferably 1.03 to 1.40. The molecular weight distribution (Mw/Mn) can be calculated by determining the weight average molecular weight (Mw) by GPC (mobile phase: chloroform; and standard substance: polystyrene), and then dividing the weight average molecular weight (Mw) by the number average molecular weight (Mn).

In the (b'), (b-1), and (b-2) components, the hydrogenated block copolymer preferably contains a hydrogenated block copolymer in which the number of polymer blocks A is two, more preferably a hydrogenated block copolymer in which the number of polymer blocks A is two and the number of polymer block B is one in its structure.

The polymer block B may be a single type of polymer block in which the proportion of the sum of 1,2-vinyl bonds and 3,4-vinyl bonds relative to ethylenic double bonds in a conjugated diene compound unit in the polymer block B is 25% or more and less than 60%. Or, the polymer block B may be a polymer block composed primarily of conjugated diene compounds, which has a polymer block B1 composed primarily of a conjugated diene compound having a proportion of the sum of 1,2-vinyl bonds and 3,4-vinyl bonds of 25 to 45%, and a polymer block B2 composed primarily of a conjugated diene compound having a proportion of the sum of 1,2-vinyl bonds and 3,4-vinyl bonds of 45% or more and less than 70%.

The structure of the block copolymer having the polymer block B1 and the polymer block B2 is represented by A-B2-B1-A, A-B2-B1, and the like, for example, where "A", "B1", and "B2" represent the polymer block A, the polymer block B1, and the polymer block B2, respectively, and can be obtained by a well-known polymerization method to control the total vinyl bonding amount based on adjusted feed sequences of respective monomer units.

When the (b) component contains the above-mentioned (b-1) and (b-2) components, the ratio (b-1):(b-2), namely, the ratio of the (b-1) component having a molecular weight peak in terms of standard polystyrene measured by GPC of 80,000 to 200,000 and the (b-2) component having a molecular weight peak in terms of standard polystyrene measured by GPC of 10,000 or more and less than 80,000, is preferably 10:90 to 50:50 and more preferably 20:80 to 40:60, in view of achieving further excellent chemical resistance and impact resistance.

The ratio of the (b-1) component and the (b-2) component can be determined by calculating the ratio of the respective areas of the peaks obtained in GPC measurements similarly to measurements of molecular weight peaks described above.

Examples of the method of controlling the ratio of the (b-1) and (b-2) components within such ranges include, but are not particularly limited to, adjusting the amount of a coupling agent during coupling processing after polymerization, for example.

Furthermore, the (b) component preferably contains a (b-3) component, in place of or in addition to the (b'), (b-1), and (b-2) components described above (note that the (b-3) component is a component not contained in any of the (b'), (b-1), and (b-2) components). The (b) component more preferably contains the (b') component and the (b-3) component, and even more preferably contains the (b-1) component, the (b-2) component, and the (b-3) component. The (b-3) component preferably has the following physical properties from the viewpoint of achieving further excellent chemical resistance and impact resistance.

More specifically, the (b-3) component has a number average molecular weight (Mn) of the polymer block A of preferably 15,000 or more, more preferably 20,000 or more, even more preferably 25,000 or more, and particularly preferably 26,000 or more, and preferably 100,000 or less, more preferably 70,000 or less, and even more preferably 50,000 or less.

The hydrogenation ratio of ethylenic double bonds in a conjugated diene compound unit included in the polymer block B is preferably 80% or more and more preferably 90% or more.

The sum of the 1,2-vinyl bonding amount and the 3,4-vinyl bonding amount (total vinyl bonding amount) relative to ethylenic double bonds in a conjugated diene compound unit contained in the polymer block B is preferably 50% or more, more preferably 55% or more, and even more preferably 65% or more, and preferably 90% or less.

The number average molecular weight (Mn) of the polymer block B is preferably from 30,000 to 100,000 and more preferably from 40,000 to 100,000. The glass transition temperature of the polymer block B after hydrogenation is preferably greater than −50° C., more preferably greater than −50° C. and 0° C. or lower, and even more preferably −40 to −10° C.

The proportion of the sum of the 1,2-vinyl bonding amount and the 3,4-vinyl bonding amount relative to ethylenic double bonds in a conjugated diene compound unit is preferably more than 50% and 90% or less, and more preferably 60 to 90%.

The hydrogenation ratio of ethylenic double bonds in the block copolymer (double bonds in a conjugated diene compound unit) is preferably 80 to 100% and more preferably 90 to 100%.

The content of the vinyl aromatic compound unit in the block copolymer prior to hydrogenation is preferably 30% by mass or more, more preferably 32% by mass or more, and particularly preferably more than 40% by mass, and is preferably 50% by mass or less and more preferably 48% by mass or less, in view of improving the fluidity and the appearance of the (b-3) component, and reducing generation of welds. The content of the vinyl aromatic compound can be measured using an ultraviolet spectrophotometer.

The molecular weight distribution (Mw/Mn) prior to hydrogenation is preferably 10 or less, more preferably 8 or less, and even more preferably 5 or less.

Production Method

A method of producing the hydrogenated block copolymers in the (b) component is not particularly limited, and a well-known production method such as anionic polymerization can be used. Examples include the methods disclosed in JP S47-11486A, JP S49-66743A, JP S50-75651A, JP S54-126255A, JP S56-10542A, JP S56-62847A, JP S56-100840A, JP H02-300218A, GB1130770A, U.S. Pat. Nos. 3,281,383A, and 3,639,517A, GB1020720A, U.S. Pat. Nos. 3,333,024A, and 4,501,857A, for example.

Modified Hydrogenated Block Copolymer

The modified product of a hydrogenated block copolymer in the (b) component is exemplified by a modified hydrogenated block copolymer that is obtained by reacting a hydrogenated block copolymer (particularly, unmodified hydrogenated block copolymer) as described above and an α,β-unsaturated carboxylic acid or a derivative thereof (ester compounds and acid anhydride compounds), with or without a radical precursor, in molten state, solution state, or slurry state, at 80 to 350° C. In this case, the α,β-unsaturated carboxylic acid or the derivative thereof is preferably grafted or added to the unmodified hydrogenated block copolymer at a proportion of 0.01 to 10% by mass, and the proportion is more preferably 7% by mass or less and particularly preferably 5% by mass or less.

In the case in which an unmodified hydrogenated block copolymer and a modified hydrogenated block copolymer are used together as the (b) component, the mixing ratio of the unmodified hydrogenated block copolymer and the modified hydrogenated block copolymer can be set without any particular limitation.

Production Method of In-Vehicle LiB Member According to First Modification

Production Method of Resin Composition for In-Vehicle LiB Member

The resin composition of the first modification can be produced by melt-kneading the (a) component, the (b) component, and components described later, if required.

In the first modification, the melt-kneading of the resin composition for an in-vehicle LiB member can be carried out in multiple steps, and when a plurality of resins are used as each of the (a) component and the (b) component in the resin composition, the melt-kneading can be carried out multiple times for separately kneading each component. More specifically, melt-kneading may be carried out in any procedure, for example and not by way of limitation, by (i) melt-kneading substantially all of the (a) component and all of some component in the (b) component to obtain a kneaded product, and then melt-kneading the kneaded product and all of the remaining component in the (b) component; or (ii) melt-kneading substantially all of the (a) component and a part of each component in the (b) component to obtain a kneaded product, and then melt-kneading the kneaded product and the remainder of each component in the (b) component. When melt-kneading is carried out multiple times, the melt-kneading is preferably carried out using substantially all of the (a) component in the first melt-kneading step. As for the (b) component, when respective components in the (b) component are melt-kneaded step by step in different melt-kneading steps, substantially all of the component to be melt-kneaded in the (b) component is added in each step. The term "substantially all" refers to preferably 97% by mass or more, more preferably 99% by mass, and even more preferably 100% by mass, for example (as used hereinafter, the "all" in melt-kneading steps of a composition means "substantially all").

The production method of the resin composition of the first modification is preferably a production method including the following steps (1-1) and (1-2) when the (b) component contains the (b') component. (1-1): melt-kneading the (a) component to obtain a kneaded product; and (1-2): adding the (b') component to the kneaded product obtained in the step (1-1), followed by further melt-kneading.

In the step (1-1), all or a part of the (a) component may be added. In the step (1-2), all or a part of the (b') component may be added. When a part of the (b') component is added in the step (1-2), all of the (b') component may be added in the step (1-1) and step (1-2). The step (1-2) is preferably a step of adding all of the (b') component to the kneaded product obtained in the step (1-1), followed by further melt-kneading.

Addition of the (b') component in the step (1-2) (particularly, addition of all of the (b') component in the step (1-2)) during melt-kneading as in this production method facilitates the (b') component to be properly dispersed in the (a) component, thereby imparting the resin composition with further excellent chemical resistance and impact resistance. The (b') component may be the (b-1) component and the (b-2) component.

The production method of the resin composition of the first modification is preferably a production method including the following steps (1-1) and (1-2) when the (b) component contains the (b') component and the (b-3) component.
(1-1) melt-kneading the (a) component and the (b-3) component to obtain a kneaded product; and
(1-2): adding the (b') component to the kneaded product obtained in the step (1-1), followed by further melt-kneading.

In the step (1-1), all or a part of the (a) component may be added. In addition, all or a part of the (b-3) component may be added. Particularly, the step (1-1) is preferably a step of melt-kneading all of the (a) component and optionally all or a part of the (b-3) component to obtain a kneaded product.

In the step (1-2), all or a part of the (b') component may be added. When a part of the (b') component is added in the step (1-2), all of the (b') component may be added in the step (1-1) and step (1-2). The step (1-2) is preferably a step of adding all of the (b') component to the kneaded product obtained in the step (1-1), followed by further melt-kneading.

Addition of the (b') component in the step (1-2) (particularly, addition of all of the (b') component in the step (1-2)) during melt-kneading as in this production method facilitates the (b') component and the (b-3) component to be properly dispersed in the (a) component, thereby imparting the resin composition with further excellent chemical resistance and impact resistance. The (b') component may be the (b-1) component and the (b-2) component.

Examples of melt-kneading machines that can be suitably used for melt-kneading the components in the production method of the resin composition of the present embodiment include, but are not particularly limited to, heated melt-kneading machines such as an extruder (e.g., a single screw extruder and a multiscrew extruder such as a twin screw extruder), a roller, a kneader, a Brabender plastograph, and a Banbury mixer. In particular, a twin screw extruder is preferable in view of kneading performance. Specific examples of twin screw extruders that can be used include the ZSK series produced by Coperion Inc., the TEM series produced by Toshiba Machine Co., Ltd., and the TEX series produced by The Japan Steel Works, Ltd.

The type, specifications, and so forth of the extruder are not specifically limited and may be commonly known examples thereof.

The following describes a preferred embodiment of a case in which an extruder such as a single screw extruder, twin screw extruder, or other multiscrew extruder is used.

The L/D (effective barrel length/barrel internal diameter) of the extruder is preferably 20 or more, more preferably 30 or more, and preferably 75 or less, more preferably 60 or less.

The extruder may be configured to include, but is not particularly limited to, in the direction of raw material flow, a first raw material feed inlet located on an upstream side, a first vacuum vent located downstream to the first raw material feed inlet, a second raw material feed inlet located downstream to the first vacuum vent, a first liquid feed pump located downstream to the second raw material feed inlet, a second vacuum vent located downstream to the first liquid feed pump, and a second liquid feed pump located downstream to the second vacuum vent.

The method by which a raw material is fed at the second raw material feeding inlet is not specifically limited and may be a method in which the raw material is simply added from an opening in an upper part of the raw material feeding inlet or a method in which the raw material is added from a side opening using a forced side feeder. In particular, a method in which the raw material is added from a side opening using a forced side feeder is preferable from a viewpoint of stable feeding.

The melt-kneading temperature (barrel setting temperature) for melt-kneading each component may be, but is not particularly limited to, 200 to 370° C. The screw rotation number may be, but is not particularly limited to, 300 to 800 rpm.

In a case in which a liquid raw material is to be added, the liquid raw material can be added by using a liquid addition pump or the like in a cylinder section of the extruder to directly feed the liquid raw material into the cylinder. The liquid addition pump may be, but is not specifically limited to, a gear pump, a flange pump, or the like, and is preferably a gear pump. In this case, in view of reducing the load to the liquid feed pump and improving the workability of the material, it is preferable to lower the viscosity of the liquid material, by heating with a heater, etc., the tank for storing the liquid material, and the portion functioning as a flow path of the liquid material, such as the piping between the tank and the liquid feed pump, the piping between the pump and the extruder cylinder, and the like.

In the production method of the resin composition for an in-vehicle LiB member according to the first modification, the structure of the in-vehicle LiB member can be controlled to be a network-like structure as described above, by adjusting the contents of the (a) component and the (b) component, as well as adjusting the structure and the molecular weight of each block portion in the (b) component. For example, the control can be made by adding the (b') component or the (b-1) and (b-2) components to the (b) component to thereby adjust the structure and the molecular weight of each block portion in these components, or by further adding the (b-3) component to thereby adjust or properly select the structure and the molecular weight of each block portion in the (b-3) component. Further, upon production of the resin composition, the control can be made by controlling the melt-kneading temperature or the screw speed to the above ranges or by adjusting the extrusion rate so that the resin temperature is prevented from being excessively raised. Further, upon production of the resin composition, the control can be made by performing steps (1-1) and (1-2) in the above production method.

Production Method of In-Vehicle LiB Member

The in-vehicle LiB member (molded article) according to the first modification can be produced by molding the above-mentioned resin composition. The production method of the molded article may be, but is not specifically limited to, injection molding, extrusion molding, profile extrusion molding, blow molding, compression molding, or the like, and is preferably injection molding from a viewpoint of more effectively obtaining the effects disclosed herein.

Second Modification to Present Embodiment

An in-vehicle LiB member according to a second modification to the present embodiment contains (c) an olefinic polymer constituted from an olefin, and has the following sea-island phase structure in a morphology image.

Figure 2A:
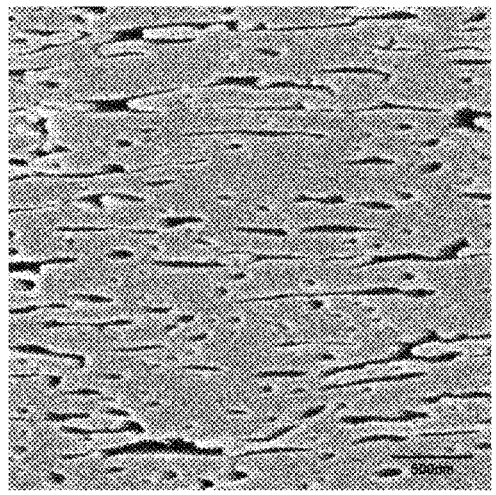
FIG. 2A illustrates a part of an image obtained by observing an in-vehicle LiB member in Example 9 under an SEM (field size: 3×3 µm), in which formation of a sea-island structure is indicated.
Figure 3A:
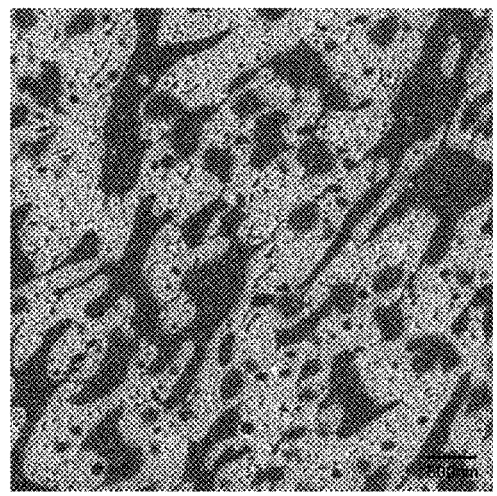
FIG. 3A illustrates a part of an image obtained by observing an in-vehicle LiB member in Example 13 under an SEM (field size: 5×5 µm), in which formation of a sea-island structure is indicated.

Specifically, the in-vehicle LiB member of the second modification exhibits a sea-island phase structure in a morphology image obtained by staining a cross section of the in-vehicle LiB member with ruthenium tetroxide and observing the cross section under an SEM (scanning electron microscope). In the in-vehicle LiB member of the second modification, as depicted in FIGS. 2A and 3A, a sea-island phase structure is formed which has a sea phase containing the (a) component which is observed to be relatively gray, and island phases containing the (c) component which are observed to be relatively black in the sea phase in a morphology image observed under a predetermined condition described later.

Figure 2B:
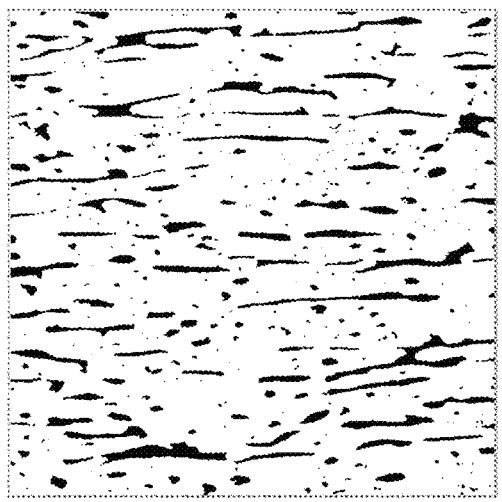
FIG. 2B is a binarized image of the image in FIG. 2A.
Figure 3B:
FIG. 3B is a binarized image of the image in FIG. 3A.

Further, in the in-vehicle LiB member of the second modification, in a second processed image (see FIGS. 2B and 3B, for example) which is obtained through a binarization of a morphology image according to a predetermined condition described later, the number per unit area (1 $\mu m^2$) of second black portions that are black after the binarization and have an area of $4.92 \times 10^{-4}$ $\mu m^2$ or more is preferably 8/$\mu m^2$ or more. Further, in the in-vehicle LiB member of the second modification, in the case where AW2 ($\mu m^2$/$\mu m^2$) represents the occupied area per unit area (1 $\mu m^2$) by second white portions that are white after the binarization, and L2 ($\mu m$/$\mu m^2$) represents a length per unit area (1 $\mu m^2$) of a total peripheral length which is a sum of peripheral lengths of second non-small portions having an area of $15 \times 10^{-4}$ $\mu m^2$ or more among the second black portions, the length L2 relative to the occupied area AW2 (L2/AW2) is preferably 7 $\mu m^{-1}$ or more.

In other words, in the in-vehicle LiB member of the second modification, a certain number of dispersed phases (second black portions having an area of $4.92 \times 10^{-4}$ $\mu m^2$ or more) excluding dispersed phases which are too small are dispersed in the morphology. Further, in the second processed image, the total length of peripheral lengths (the length of boundaries between white portions and black portions) per unit area (1 $\mu m^2$) of second non-small portions (having an area of $15 \times 10^{-4}$ $\mu m^2$ or more) which are second black portions in sizes as large as a certain degree, relative to the occupied area per unit area (1 $\mu m^2$) by the second white portions, is a predetermined length. Thus, the sea phase has boundaries in certain lengths with dispersed phases in sizes as large as a certain degree per unit area in the morphology.

Advantages and effects of the in-vehicle LiB member of the second modification will be described below.

In the in-vehicle LiB member of the second modification, since the (c) component is contained in the in-vehicle LiB member, the in-vehicle LiB member includes the component contributing to the chemical resistance and the impact resistance. As a result, the chemical resistance and the impact resistance are improved as compared with a case where only the (a) component is included.

In addition, when the number of second black portions is 8/$\mu m^2$ or more and the length L2 of the total periphery lengths of second non-small portions per unit area (1 $\mu m^2$) relative to the occupied area AW2 by second white portions per unit area (1 $\mu m^2$) (L2/AW2) is 7 $\mu m^{-1}$ or more in the second processed image, formation of an effective sea-island structure can be induced in a state where the island phases are mixed not excessively uniformly in the sea phase in the morphology of the LiB member of the second modification.

Specifically, when the number of second black portions is 8/$\mu m^2$ or more, island phases that are not too small are present at a moderate degree of dispersion per unit area in the morphology. As a result, an external force exerted on the sea phase (having a relatively low impact resistance) is mitigated by the island phases (having relatively high impact resistances) that are dispersed apart from each other at moderate distances, which improves the impact resistance of the in-vehicle LiB member as a whole. Note that the case wherein the number reduces to less than 8/$\mu m^2$ occurs when the content of the (c) component is relatively small relative to the (a) component, etc., and improvements in the chemical resistance and the impact resistance tends to be difficult in such a case.

Further, in the case where the length L2 of the total periphery lengths of second non-small portions per unit area relative to the occupied area AW2 by second white portions per unit area (L2/AW2) is 7 $\mu m^{-1}$ or more, the second white portions are bordered with second non-small portions having certain lengths per unit area. Thus, the island phases (having relatively high chemical resistances) extend into the sea phase (having a relatively lower chemical resistance) while coming into contact with the sea phase to a large extent. Thus, the island phases have indefinite forms (amoebas-like forms) and can be present so as to encapsulate the sea phase to thereby improve the chemical resistance, and the island phases may prevent an extension of a crack possibly induced by a chemical agent in the sea phase. The reason why the second non-small portions are defined as second black portions having an area of $15 \times 10^{-4}$ $\mu m^2$ or more is that there is a tendency that island phases having relatively small areas cannot be present so as to encapsulate the sea phase or cannot prevent an extension of a crack possibly induced by a chemical agent in the sea phase. Further, the case where the length L2 of the total periphery lengths of second non-small portions per unit area relative to the occupied area AW2 by second white portions per unit area (L2/AW2) of less than 7 $\mu m^{-1}$ may occur when the (a) component and the (c) component are melt-kneaded excessively in melt-kneading in a production process of an in-vehicle LiB member. In this case, island phases may be finely dispersed in the sea phase, and the sea-island phase structure of the second modification may be destroyed, which makes an improvement in the chemical resistance insufficient.

Accordingly, in the in-vehicle LiB member of the second modification, an effective sea-island phase structure is formed by a large number of island phases having elongated and bent shapes in sizes as large as a certain degree, and a large number of island phases dispersed to a degree not too fine. As a result, the chemical resistance and the impact resistance can be effectively improved, and a predetermined critical strain in a chemical resistance evaluation and a predetermined Charpy impact strength can be suitably satisfied.

If the (c) component is excessively mixed with the (a) component in melt-kneading of the (a) component and the (c) component, island phases would be finely dispersed in the morphology of the in-vehicle LiB member. In this state, the number of black portions having areas less than $4.92 \times 10^{-4}$ $\mu m^2$ tends to increase excessively or the number of second non-small portions tends to decrease thereby causing a decrease in the total periphery length thereof, which tends to reduce the chemical resistance and the impact resistance.

Further, the second modification contains the (c) component which contributes to improvements in the chemical resistance and the impact resistance more largely than the (b) component. Thus, when the (c) component is present in the composition to form island phases, the chemical resistance and the impact resistance can be improved more largely than in the case where the (b) component forms dispersed phases as in the first modification.

Here, in the second modification, the number of second black portions is preferably 8/$\mu m^2$ or more, more preferably 10/$\mu m^2$ or more, and even more preferably 13/$\mu m^2$ or more. Further, the length L2 of the total periphery lengths of second non-small portions per unit area (1 $\mu m^2$) relative to the occupied area AW2 by first white portions per unit area (1 $\mu m^2$) (L2/AW2) is preferably 7 $\mu m^{-1}$ or more, more preferably 7.5 $\mu m^{-1}$ or more, and even more preferably 8 $\mu m^{-1}$ or more. This makes it possible to more suitably satisfy a predetermined critical strain in a chemical resistance evaluation and a predetermined Charpy impact strength.

Further, the number of second black portions is preferably 40/$\mu m^2$ or less. Further, the length L2 of the total periphery lengths of second non-small portions per unit area (1 $\mu m^2$) relative to the occupied area AW2 by second white portions per unit area (1 $\mu m^2$) (L2/AW2) is preferably 30 $\mu m^{-1}$ or less.

The case where the number of second black portions exceeds 40/$\mu m^2$ may occur when the contents of the optional (b) component and/or the (c) component are relatively large relative to the content of the (a) component, etc. In this case, improvement in the moldability of an in-vehicle LiB member and a weight reduction tends to be difficult. The case where L2/AW2 exceeds 30 $\mu m^{-1}$ may occur when the content of the (c) component is relatively large relative to the content of the (a) component, and the moldability, the dimension stability, and a low specific gravity derived from the (a) component may not be achieved sufficiently.

In the in-vehicle LiB member of the second modification, the number per unit area of second small to medium portions having areas of $4.92 \times 10^{-4}$ to $100 \times 10^{-4}$ $\mu m^2$ among the second black portions is preferably 6/$\mu m^2$ or more, more preferably 8/$\mu m^2$ or more, and even more preferably 10/$\mu m^2$ or more. This ensures that island phases having appropriate sizes are present at an appropriate degree of dispersion within a unit area in the morphology, so that a predetermined Charpy impact strength can be more suitably satisfied.

Further, the number per unit area of second small to medium portions having areas of $4.92 \times 10^{-4}$ to $100 \times 10^{-4}$ $\mu m^2$ among the second black portions is preferably 40/$\mu m^2$ or less. The case where the number exceeds 40/$\mu m^2$ may occur when the contents of the optional (b) component and/or the (c) component are relatively large relative to the content of the (a) component, etc. In this case, improvement in the moldability of an in-vehicle LiB member and a weight reduction tends to be difficult.

In the in-vehicle LiB member of the second modification, the occupied area per unit area by the second black portions having areas $4.92 \times 10^{-4}$ or more is preferably 0.03 to 0.5 $\mu m^2/\mu m^2$, more preferably 0.05 to 0.45 and even more preferably 0.07 to 0.40 Since a more effective sea-island structure can be formed in which the island phases are mixed with the sea phase not too uniformly, a predetermined critical strain in a chemical resistance evaluation and a predetermined Charpy impact strength can be more suitably satisfied.

In the second modification, the resin composition for an in-vehicle lithium ion battery member preferably contains the above-mentioned (b) component. When the resin composition contains the (b) component, island phases containing the (c) component are made to be surrounded by the (b) component having a higher compatibility with the (a) component than the (c) component on the side of the outer peripheries of the island phases (the (c) component having a lower compatibility with the (a) component than the (b) component is positioned at the center portions of the island phases). Thus, the effects of the (c) component having high chemical resistance and impact resistance are more likely to be exhibited, and a predetermined critical strain in a chemical resistance evaluation and a predetermined Charpy impact strength can be more suitably satisfied.

Here, in the in-vehicle LiB member of the second modification, the content of the (a) component is preferably 60 to 85% by mass, more preferably 63 to 82% by mass, and even more preferably 66 to 79% by mass, with respect to 100% by mass of the total amount of the (a) component and the (c) component. Further, the content of the (c) component is preferably 15 to 40% by mass, more preferably 18 to 37% by mass, and even more preferably 21 to 34% by mass, with respect to 100% by mass of the total amount of the (a) component and the (c) component.

Further, when the resin composition contains the (b) component, the content of the (c) component is preferably 3 to 30% by mass, more preferably 6 to 27% by mass, and even more preferably 9 to 24% by mass, with respect to 100% by mass of the total amount of the (a), (b), and (c) components. Further, the content of the (b) component is preferably 3 to 20% by mass, more preferably 6 to 17% by mass, and even more preferably 9 to 14% by mass, with respect to 100% by mass of the total amount of the (a), (b), and (c) components. Further, in such a case, the ratio of the content of the (c) component to the content of the (b) component ((c) component:(b) component) is preferably 1:2 to 5:1, more preferably 1:1.5 to 4.5:1.

By setting the amounts of the (a) component, the optional (b) component, and the (c) component in one of the above ranges, the number of second black portions and the number of second non-small portions in the second processed image can be made to fall within predetermined ranges.

Further, in the in-vehicle LiB member of the second modification, the total content of the (a) component, the optional (b) component, and the (c) component is preferably 70% by mass or more, more preferably 80% by mass or more, even more preferably 90% by mass or more, and particularly preferably 95% by mass or more, with respect to 100% by mass of the resin components in the composition constituting the in-vehicle LiB member. When a resin component compatible with the (a) component is contained in the composition constituting the in-vehicle LiB member, the total content of the (a), (b), and (c) components is preferably 90% by mass or more, more preferably 95% by mass or more, even more preferably 97% by mass or more, and particularly preferably 99% by mass or more, with respect to 100% by mass of resin components in the composition constituting the in-vehicle LiB member.

Further, in the in-vehicle LiB member of the second modification, the total content of the (a) component and the (b) component is preferably 50% by mass or more, more preferably 60% by mass or more, even more preferably 70% by mass or more, and particularly preferably 80% by mass or more, with respect to 100% by mass of the composition constituting the in-vehicle LiB member.

(a) Component and (b) Component

In the in-vehicle LiB member of the second modification, the same resins of the (a) component and the (b) component which can be used for the in-vehicle LiB member of the first modification can be used for the (a) component and the (b) component, respectively. In the second modification, when the (b') component is contained in the (b) component, increasing the contribution by the (b') component enables the second non-small portions to be elongated to thereby increase the peripheral length of each portion, as well as increasing the number of second small to medium portions, as depicted in FIG. 2. In the second modification, the (b') component of the in-vehicle LiB member is preferably contained.

Further, when the (b-3) component is contained in the (b) component, increasing the contribution by the (b-3) component makes the second non-small portions to be closer to spherical shapes while increasing the peripheral length of each portion, as well as maintaining the number of second small to medium portions not to be too large, as depicted in FIG. 3. The (b) component preferably contains the (b-3) component, more preferably does not substantially contain (b') component. The term "not substantially contain" as used therein means that the content is preferably 2% by mass or less, more preferably 1% by mass or less, even more preferably 0.5% by mass or less, with respect to 100% by mass of the composition constituting the in-vehicle LiB member, and it is particularly preferable that no (b') component is contained.

(c) Olefinic Polymer

Examples of the (c) component include, but are not particularly limited to, homopolymers of olefinic monomers, and copolymers of two or more monomers including an olefinic monomer, for example. Of these, a copolymer of ethylene and an α-olefin other than ethylene is preferable in view of the low-temperature impact resistance. Here, in view of the chemical resistance and the impact resistance of the obtained resin composition, a propylene unit is preferably excluded from the monomer unit constituting the (c) component.

Here, "a propylene unit is excluded" in an "olefinic polymer constituted from an olefin" encompasses cases where propylene is included in an amount not hindering the effects of the present disclosure as a constitutional unit, and encompasses cases where the content of propylene unit in the (c) component in the all constitutional units constituting the (c) component is less than 0.1% by mass, for example.

Examples of the (c) component include copolymers of ethylene and one or two or more C3-C20 α-olefins, for example. Of these, the (c) component is more preferably a copolymer of ethylene and one or two or more C3-C8 α-olefins, even more preferably a copolymer of ethylene and one or two or more comonomers selected from the group consisting of 1-propylene, 1-butene, 1-hexene, 4-methyl-1-pentene, and 1-octene, and particularly preferably a copolymer of ethylene and 1-butene. Such a copolymer used as the (c) component tends to provide a resin composition having a higher impact resistance and a higher chemical resistance.

The (c) component may be used alone or in a combination of two or more. In addition, two or more ethylene-α-olefin copolymers may be used as the (c) component.

The content of ethylene in the (c) component is preferably 5 to 95% by mass and more preferably 30 to 90% by mass relative to the total amount of the olefinic polymer, in view of the flexibility of the resin composition.

The content of α-olefins other than ethylene in the (c) component is not particularly limited. Yet, the content of α-olefin relative to the total amount of the olefinic polymer is preferably 5% by mass or more and more preferably 20% by mass or more in view of the flexibility of the resin composition; and is preferably 50% by mass or less and more preferably 48% by mass or less in view of the rigidity of the resin composition.

The brittleness temperature of the (c) component is −50° C. or lower, and is preferably −60° C. or lower and more preferably −70° C. or lower in view of achieving further excellent impact resistance and chemical resistance.

Brittleness temperatures can be measured in accordance with ASTM D746.

The density of the (c) component measured in accordance with JIS K7112 (density of the raw material before kneading) is preferably 0.87 g/cm$^3$ or more and more preferably 0.90 g/cm$^3$ or more in view of the chemical resistance of the resin composition.

Examples of the method of controlling the density of the (c) component within such ranges include, but are not particularly limited to, adjusting the density by controlling the ratio of content of ethylene units, for example.

The melt flow rate (MFR; density of the raw material before kneading, measured at 190° C. under a load of 2.16 kgf in accordance with ASTM D1238) of the (c) component is preferably 0.1 to 5.0 g/10 minutes and more preferably 0.3 to 4.0 g/10 minutes in view of stabilization of the morphology achieved by dispersion of the (c) component into the resin composition and the impact resistance of the resin composition.

Examples of the method of controlling the melt flow rate of the (c) component within such ranges include, but are not particularly limited to, adjusting the polymerization temperature and the polymerization pressure, and adjusting the molar ratio of the concentration of the monomer, such as ethylene and an α-olefin, and the concentration of hydrogen, in the polymerization system, during production of the (c) component, for example.

The (c) component may be, for example, an olefinic polymer rubber constituted from an olefin.

The torsional rigidity of the (c) component is preferably 1 to 30 MPa and more preferably 1 to 25 MPa in view of imparting a composition with a sufficient impact resistance. The torsional rigidity of the (c) component can be measured in accordance with ASTM D1043.

The Shore A hardness of the (c) component is preferably 40 to 110 and more preferably 50 to 100 in view of imparting a composition with a sufficient impact resistance. The Shore A hardness of the (c) component can be measured in accordance with JIS K6253.

Examples of the method of preparing the (c) component include, but are not particularly limited to, a method in which a catalyst (e.g., a catalyst based on titanium, metallocene, or vanadium) that can readily provide an α-olefin polymer having a high molecular weight under conventional process conditions. Of these, methods employing a metallocene catalyst and a titanium chloride catalyst are preferable in view of stability of structural controls. As a production method of an ethylene-α-olefin copolymer, well-known methods described in JP H06-306121A and JP H07-500622A and the like can be used.

Production Method of In-Vehicle LiB Member According to Second Modification

Production Method of Resin Composition for In-Vehicle LiB Member

The resin composition for an in-vehicle LiB member according to the second modification can be produced by melt-kneading the (a) component, the optional (b) component, the (c) component, and components described later, if required. The resin composition for an in-vehicle LiB member according to the second modification can be produced in the same manner as the resin composition for an in-vehicle LiB member according to the first modification described above. In the production method of the resin composition for an in-vehicle LiB member according to the second modification, the structure of the resin composition can be controlled to be a sea-island structure as described above, by adjusting the contents of the (a) component, the optional (b) component, and the (c) component, as well as adjusting the structure and the molecular weight of each block portion in the optional (b) component or adjusting the structure and the molecular weight of the (c) component. Further, upon production of the resin composition, the control can be made by controlling the melt-kneading temperature or the screw speed to certain ranges or by adjusting the extrusion rate so that the resin temperature is prevented from being excessively raised. Further, upon production of the resin composition, the control can be made by performing steps (2-1) and (2-2) in the production method described later.

The production method of the resin composition of the second modification is preferably a production method comprising the following steps (2-1) and (2-2):

(2-1): melt-kneading the (a) component to obtain a kneaded product; and (2-2): adding the (c) component to the kneaded product obtained in the step 10 (2-1), followed by further melt-kneading.

In the step (2-1), all or a part of the (a) component may be added.

In the step (2-2), all or a part of the (c) component may be added. When a part of the (c) component is added in the step (2-2), all of the (c) component may be added in the step (2-1) and step (2-2). The step (2-2) is preferably a step of adding all of the (c) component to the kneaded product obtained in the step (2-1), followed by further melt-kneading.

Addition of the (c) component in the step (2-2) (particularly, addition of all of the (c) component in the step (2-2)) during melt-kneading as in this production method facilitates the (c) component to be properly dispersed in the (a) component, thereby imparting the resin composition with further excellent chemical resistance and impact resistance.

Further, in the steps (2-1) and (2-2) of the production method of the resin composition of the second modification, when the (b) component is contained, preferably, all of the (b) component is added in the step (2-1) or (2-2) described above, or a part of the (b) component is added in the step (2-1) or (2-2). This facilitates the (b) component and the (c) component to be properly dispersed in the (a) component, thereby imparting the resin composition with further excellent chemical resistance and impact resistance.

The production method of the resin composition of the second modification is preferably a production method including the following steps (2-1) and (2-2) when the (b) component is contained which contains the above-mentioned (b-3) component.

(2-1) melt-kneading the (a) component and the (b-3) component to obtain a kneaded product; and (2-2): adding the (c) component to the kneaded product obtained in the step (2-1), followed by further melt-kneading.

In the step (2-1), all or a part of the (a) component may be added. In addition, all or a part of the (b-3) component may be added. Particularly, the step (2-1) is preferably a step of melt-kneading all of the (a) component and optionally all or a part of the (b-3) component to obtain a kneaded product.

In the step (2-2), all or a part of the (c) component may be added. When a part of the (c) component is added in the step (2-2), all of the (c) component may be added in the step (2-1) and step (2-2). The step (2-2) is preferably a step of adding all of the (c) component to the kneaded product obtained in the step (2-1), followed by further melt-kneading.

Addition of the (c) component in the step (2-2) (particularly, addition of all of the (c) component in the step (2-2)) during melt-kneading as in this production method facilitates the (c) component to be properly dispersed in the (a) component, thereby imparting the resin composition with further excellent chemical resistance and impact resistance.

The production method of the resin composition of the second modification is preferably a production method including the following steps when the (b) component is contained which contains the above-mentioned (b')-component. More specifically, in such a case, the (b') component is preferably added together with the (c) component in the step (2-2). Note that all or a part of the (b') component may be added in the step (2-2). When a part of the (b') component is added in the step (2-2), all of the (b') component may be added in the step (2-1) and step (2-2). The step (2-2) is more preferably a step of adding all of the (b') component to the kneaded product obtained in the step (2-1), followed by further melt-kneading. Addition of the (b') component in the step (2-2) (particularly, addition of all of the (b') component in the step (2-2)) during melt-kneading as in this production method facilitates the (b') component to be properly dispersed in the (a) component, thereby imparting the resin composition with further excellent chemical resistance and impact resistance. The (b') component may be the (b-1) component and the (b-2) component.

Production Method of In-Vehicle LiB Member

The in-vehicle LiB member (molded article) according to the second modification can be produced in the same manner as the resin composition for an in-vehicle LiB member according to the first modification described above.

Here, the resin composition for an in-vehicle LiB member according to the present embodiment (including each of the modified examples as described above) may or may not optionally include the following components.

(d) Phosphate Ester Compound

In the resin composition for an in-vehicle LiB member according to the present embodiment, a (d) phosphate ester compound can be optionally used. The (d) phosphate ester compound is not particularly limited, and any phosphate ester compounds (e.g., phosphate ester compound and condensed phosphate ester compounds) that have effects of improving the flame retardancy of the resin composition can be used. Examples include triphenyl phosphate, phenyl bisdodecyl phosphate, phenyl bisneopentyl phosphate, phenyl-bis(3,5,5'-trimethyl-hexyl phosphate), ethyl diphenyl phosphate, 2-ethyl-hexyl di(p-tolyl)phosphate, bis(2-ethylhexyl)-p-tolyl phosphate, tritolyl phosphate, bis(2-ethylhexyl)phenyl phosphate, tri(nonylphenyl)phosphate, di(dodecyl)-p-tolyl phosphate, tricresyl phosphate, dibutylphenyl phosphate, 2-chloro-ethyl diphenyl phosphate, p-tolyl bis (2,5,5'-trimethylhexyl)phosphate, 2-ethylhexyl diphenyl phosphate, bisphenol A bis(diphenyl phosphate), diphenyl-(3-hydroxyphenyl)phosphate, bisphenol A bis(dicresyl phosphate), resorcinol bis(diphenyl phosphate), resorcinol bis(dixylenyl phosphate), 2-naphthyl diphenyl phosphate, 1-napthyl diphenyl phosphate, and di(2-naphthyl)phenyl phosphate.

In particular, it is preferable that the (d) phosphate ester compound has, as a main component, at least one selected from the group consisting of aromatic condensed phosphate ester compounds represented by the following formula (4)

[Chemical Formula 4]

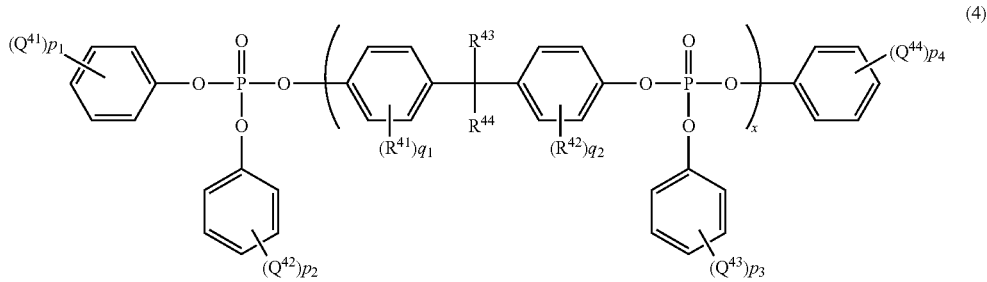

(4)

[in formula (4), $Q^{41}$, $Q^{42}$, $Q^{43}$, and $Q^{44}$ are each independently, an alkyl group having a carbon number of 1 to 6; $R^{41}$ and $R^{42}$ are each independently, a methyl group; $R^{43}$ and $R^{44}$ are each independently, a hydrogen atom or a methyl group; x is an integer of 0 or more; $p_1$, $p_2$, $p_3$, and $p_4$ are each an integer of 0 to 3; and $q_1$ and $q_2$ are each an integer of 0 to 2]; and the following formula (5)

[Chemical Formula 5]

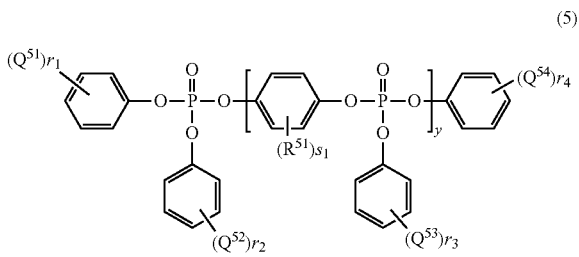

(5)

[in formula (5), $Q^{51}$, $Q^{52}$, $Q^{53}$, and $Q^{54}$ are each independently, an alkyl group having a carbon number of 1 to 6; $R^{51}$ is a methyl group; y is an integer of 0 or more; $r_1$, $r_2$, $r_3$, and $r_4$ are each an integer of 0 to 3; and si is an integer of 0 to 2].

Note that the condensed phosphate ester compounds represented by formula (4) and formula (5) may each include a plurality of types of molecules, and n is preferably an integer of 1 to 3 for each of the molecules.

In a suitable (d) phosphate ester compound having at least one selected from the group consisting of condensed phosphate ester compounds represented by formula (4) and formula (5) as a main component, overall, the average value of x and y is preferably 1 or more. This suitable (d) phosphate ester compound can usually be acquired as a mixture containing 90% or more of compounds having x and y of 1 to 3, as well as polymeric products having x and y of 4 or more and other by-products, besides the compounds having x and y of 1 to 3.

The content of the (d) phosphate ester compound is preferably 5 to 30% by mass and more preferably 10 to 20% by mass, with respect to 100% by mass of the composition constituting the in-vehicle LiB member.

(e) Phosphinate

In the resin composition for an in-vehicle LiB member according to the present embodiment, (e) a phosphinate can be optionally used. The (e) phosphinate may be, for example, at least one selected from the group consisting of:

a phosphinate represented by the following formula (1)

[Chemical Formula 6]

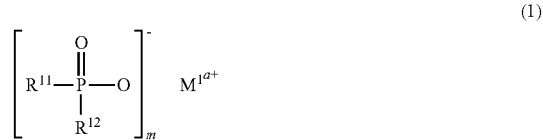

(1)

[in formula (1), $R^{11}$ and $R^{12}$ are each independently a linear or branched alkyl group having a carbon atom number of 1 to 6 and/or an aryl group having a carbon atom number of 6 to 10; $M^1$ is at least one selected from the group consisting of a calcium ion, a magnesium ion, an aluminum ion, a zinc ion, a bismuth ion, a manganese ion, a sodium ion, a potassium ion, and a protonated nitrogenous base; a is an integer of 1 to 3; m is an integer of 1 to 3; and a=m], and a diphosphinate represented by the following formula (2)

[Chemical Formula 7]

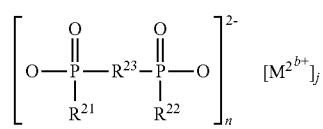

(2)

[in formula (2), $R^{21}$ and $R^{22}$ are each independently a linear or branched alkyl group having a carbon atom number of 1 to 6 and/or an aryl group having a carbon atom number of 6 to 10, $R^{23}$ is a linear or branched alkylene group having a carbon atom number of 1 to 10, an arylene group having a carbon atom number of 6 to 10, an alkylarylene group having a carbon atom number of 6 to 10, or an arylalkylene group having a carbon atom number of 6 to 10, $M^2$ is at least one selected from the group consisting of a calcium ion, a magnesium ion, an aluminum ion, a zinc ion, a bismuth ion, a manganese ion, a sodium ion, a potassium ion, and a protonated nitrogenous base, b is an integer of 1 to 3, n is an integer of 1 to 3, j is an integer of 1 or 2, and bxj=2n].

Moreover, the (e) phosphinate may be a mixture of a phosphinate represented by formula (1) and a diphosphinate represented by formula (2).

Examples of such (e) phosphinate include, but are not specifically limited to, calcium dimethylphosphinate, magnesium dimethylphosphinate, aluminum dimethylphosphinate, zinc dimethylphosphinate, calcium ethylmethylphosphinate, magnesium ethylmethylphosphinate, aluminum ethylmethylphosphinate, zinc ethylmethylphosphinate, calcium diethylphosphinate, magnesium diethylphosphinate, aluminum diethylphosphinate, zinc diethylphosphinate, calcium methyl-n-propylphosphinate, magnesium methyl-n-propylphosphinate, aluminum methyl-n-propylphosphinate, zinc methyl-n-propylphosphinate, calcium methane di(methylphosphinate), magnesium methane di(methylphosphinate), aluminum methane di(methylphosphinate), zinc methane di(methylphosphinate), calcium benzene-1,4-(dimethylphosphinate), magnesium benzene-1,4-(dimethylphosphinate), aluminum benzene-1,4-(dimethylphosphinate), zinc benzene-1,4-(dimethylphosphinate), calcium methylphenylphosphinate, magnesium methylphenylphosphinate, aluminum methylphenylphosphinate, zinc methylphenylphosphinate, calcium diphenylphosphinate, magnesium diphenylphosphinate, aluminum diphenylphosphinate, and zinc diphenylphosphinate. The (e) phosphinate is preferably calcium dimethylphosphinate, aluminum dimethylphosphinate, zinc dimethylphosphinate, calcium ethylmethylphosphinate, aluminum ethylmethylphosphinate, zinc ethylmethylphosphinate, calcium diethylphosphinate, aluminum diethylphosphinate, or zinc diethylphosphinate, and more preferably aluminum diethylphosphinate.

Examples of commercially available products that can be used as the (e) phosphinate include, but are not particularly limited to, Exolit® (Exolit is a registered trademark in Japan, other countries, or both) OP1230, OP1240, OP1311, OP1312, OP930, and OP935 manufactured by Clariant (Japan) K. K.

The content of the (e) phosphinate is preferably 5 to 30% by mass and more preferably 10 to 20% by mass, with respect to 100% by mass of the composition constituting the in-vehicle LiB member.

(f) Polypropylene Resin

The resin composition for the in-vehicle LiB member according to the present embodiment preferably does not substantially contain a (f) polypropylene resin in view of the low temperature impact. The term "not substantially contain" as used herein means that the content of the (f) polypropylene resin in the resin composition is less than 0.1%.

Examples of the (f) polypropylene resin include, but are not specifically limited to, polymers having propylene units, such as homopolypropylene, a copolymer including a polypropylene block, a modified polypropylene, and a mixture thereof.

The content of the polypropylene resin in the resin composition can be determined, for example, by freezing the resin composition and pulverizing it into powder, subsequently dissolving the powder to chloroform at 23° C., dissolving the insoluble component to o-dichlorobenzene at 150° C. and collecting a soluble fraction, and determining the content of the collected fraction by means of NMR.

(g) Thermoplastic Resin

Examples of a thermoplastic resin (g) other than the (a) to (c) and (f) components used optionally in the present embodiment include, but are not particularly limited to, polystyrene, syndiotactic polystyrene, and high impact polystyrene.

((h) Other Additives)

Examples of additives (h) other than the (a) to (g) components that may optionally be used in the present embodiment include, but are not particularly limited to, vinyl aromatic compound-conjugated diene compound block copolymers other than the (b) component, olefin elastomers other than the (c) and (f) components, antioxidants, metal deactivators, heat stabilizers, flame retardants other than the (d) and (e) components (for example, ammonium polyphosphate compounds, magnesium hydroxide, aromatic halogen-containing flame retardants, silicone flame retardants, and zinc borate), fluorine-containing polymers, plasticizers (for example, low molecular weight polyethylene, epoxidized soybean oil, polyethylene glycol, and esters of fatty acids), flame retardant synergists such as antimony trioxide, weather (light) resistance modifiers, nucleating agents for polyolefins, slip agents, various colorants, mold release agents, and mixing agents (e.g., copolymers other than those described above having a segment chain with a high compatibility with the (a) component and a segment chain with a high compatibility with the (b) component and/or the (c) component.

EXAMPLES

The following describes embodiments of this disclosure based on examples, but this disclosure is not limited to these examples.

Raw materials used for resin compositions and molded articles in the examples and comparative examples were as follows.

(a) Polyphenylene Ether Resin (a-i): Polyphenylene ether obtained through oxidative polymerization of 2,6-xylenol and having a reduced viscosity (chloroform solution with $\eta_{sp}/c$: 0.5 g/dL) of 0.51 dL/g (a-ii): Polyphenylene ether obtained through oxidative polymerization of 2,6-xylenol and having a reduced viscosity (chloroform solution with $\eta_{sp}/c$: 0.5 g/dL) of 0.42 dL/g Note that the reduced viscosity was measured with an Ubbelohde viscosity tube by using a chloroform solution with $\eta_{sp}/c$ of 0.5 g/dL under the condition of a temperature of 30° C.

(b) Hydrogenated Block Copolymer

An unmodified block copolymer was synthesized which had a polymer block A constituted from polystyrene and a polymer block B constituted from polybutadiene. The physical properties of the obtained block copolymer were as follows.

(b-i): Mixture of the following (b-i-1) and (b-i-2):

(b-i-2): The content of polystyrene in the block copolymer prior to hydrogenation: 30% by mass; the molecular weight peak of the block copolymer after hydrogenation: 65,000; the number average molecular weight (Mn) of polystyrene blocks: 19,500; the number average molecular weight (Mn) of polybutadiene blocks: 45,500; the molecular weight distribution (Mw/Mn) of the block copolymer prior to hydrogenation: 1.10; the sum of 1,2-vinyl bonds and 3,4-vinyl bonds relative to double bonds in a polybutadiene unit: 40%; the hydrogenation ratio to polybutadiene parts constituting the polybutadiene block: 35%; and the glass transition temperature of the polybutadiene block after hydrogenation: −80° C.

(b-i-1): The content of polystyrene in the block copolymer prior to hydrogenation: 30% by mass; the molecular weight peak of the block copolymer after hydrogenation: 125,000; the number average molecular weight (Mn) of polystyrene blocks: 18,750; the number average molecular weight (Mn) of polybutadiene blocks: 87,500; the molecular weight distribution (Mw/Mn) of the block copolymer prior to hydrogenation: 1.10; the sum of 1,2-vinyl bonds and 3,4-vinyl bonds relative to double bonds in a polybutadiene unit: 40%; the hydrogenation ratio to polybutadiene parts constituting the polybutadiene block: 35%; and the glass transition temperature of the polybutadiene block after hydrogenation: −80° C.

Mixing ratio (b-i-1):(b-i-2)=30:70

The vinyl aromatic compound content was measured using an ultraviolet spectrophotometer. The number average molecular weight (Mn) and the molecular weight peak were determined using GPC (mobile phase: chloroform; standard substance: polystyrene). The molecular weight distribution (Mw/Mn) was calculated by determining the weight average molecular weight (Mw) by GPC (mobile phase: chloroform; standard substance: polystyrene) according to a conventional and commonly known method, and then dividing the weight average molecular weight (Mw) by the number average molecular weight (Mn). The total amount of vinyl bonding was determined through measurement using an infrared spectrophotometer and calculation in accordance with the method described in Analytical Chemistry, Volume 21, No. 8, August 1949. The hydrogenation rate was measured using a nuclear magnetic resonance (NMR) spectrometer. The mixing ratio was determined from the ratio of peak areas obtained from the GPC measurements.

(b-ii)

A mixture of the same components as those of (b-i-1) and (b-i-2) described in the above (b-i) with a ratio of (b-i-1):(b-i-2)=5:95

(b-iii)

A mixture of the same components as those of (b-i-1) and (b-i-2) described in the above (b-i) with a ratio of (b-i-1):(b-i-2)=55:45

(b-iv)

A block copolymer having a B-A-B-A block structure in which the polymer blocks A were formed from polystyrene and the polymer blocks B were formed from polybutadiene was synthesized by a commonly known method. The synthesized block copolymer was hydrogenated by a commonly known method. Polymer modification was not performed. The physical properties of the unmodified hydrogenated block copolymer that was obtained were as follows.

The content of polystyrene in the block copolymer prior to hydrogenation: 44% by mass; the number average molecular weight (Mn) of the block copolymer after hydrogenation: 95,000; the number average molecular weight (Mn) of polystyrene blocks: 41,800; the number average molecular weight (Mn) of polybutadiene blocks: 53,200; the molecular weight distribution (Mw/Mn) of the block copolymer prior to hydrogenation: 1.06; the sum of 1,2-vinyl bonds and 3,4-vinyl bonds relative to double bonds in a polybutadiene unit: 75%; the hydrogenation ratio to polybutadiene parts constituting the polybutadiene block: 99%; and the glass transition temperature of the polybutadiene block after hydrogenation: −15° C.

(b-v)

A block copolymer having a block structure of A-B was obtained in the same manner as in the above (b-iv). The physical properties of the unmodified hydrogenated block copolymer that was obtained were as follows.

The content of polystyrene in the block copolymer prior to hydrogenation: 50%; the number average molecular weight (Mn) of the block copolymer prior to hydrogenation: 60,000; the number average molecular weight (Mn) of polystyrene blocks: 30,000; the number average molecular weight (Mn) of polybutadiene blocks: 30,000; the molecular weight distribution (Mw/Mn) of the block copolymer prior to hydrogenation: 1.08; the sum of 1,2-vinyl bonds and 3,4-vinyl bonds relative to double bonds in a polybutadiene unit: 75%; and the hydrogenation ratio to polybutadiene parts constituting the polybutadiene block: 99.9%.

(b-vi)

A polymer was obtained in the same manner as in the above (b-iv). The physical properties of the unmodified hydrogenated block copolymer that was obtained were as follows.

The content of polystyrene in the block copolymer prior to hydrogenation: 44%; the number average molecular weight (Mn) of the block copolymer prior to hydrogenation: 95,000; the number average molecular weight (Mn) of polystyrene blocks: 41,800; the number average molecular weight (Mn) of polybutadiene blocks: 53,200; the molecular weight distribution (Mw/Mn) of the block copolymer prior to hydrogenation: 1.06; the sum of 1,2-vinyl bonds and 3,4-vinyl bonds relative to double bonds in a polybutadiene unit: 75%; and the hydrogenation ratio to polybutadiene parts constituting the polybutadiene block: 99.9%.

(c) Olefinic Copolymer (c-i): Ethylene-butene copolymer, product name: TAFMER DF610 manufactured by Mitsui Chemicals, Inc.; the MFR: 1.2 g/10 minutes (under the conditions of 190° C. and 2.16 kgf); the brittleness temperature: <−70° C.; and the density: 0.862 g/cm$^3$ (c-ii): Ethylene-butene copolymer, product name: TAFMER DF810 manufactured by Mitsui Chemicals, Inc.; the MFR: 1.2 g/10 minutes (under the conditions of 190° C. and 2.16 kgf); the brittleness temperature: <−70° C.;

and the density: 0.885 g/cm$^3$ (c-iii)

Ethylene-butene copolymer, product name: TAFMER DF7350 manufactured by Mitsui Chemicals, Inc.; the MFR: 36 g/10 minutes (under the conditions of 190° C. and 2.16 kgf); the brittleness temperature: <−70° C.; and the density: 0.870 g/cm$^3$ (d) Phosphate Ester Compound (d): E890 (condensed phosphate ester compound) produced by Daihachi Chemical Industry Co., Ltd.

(e) Phosphinate (e): Exolit OP1230 (corresponding to formula (1)) produced by Clariant Japan K.K.

Other Components

High-impact polystyrene (HIPS): PSJ-POLYSTYRENE H9302 manufactured by PS Japan Corporation Methods (1) to (5) to measure physical properties in the examples and comparative examples were as follows.

(1) Chemical Resistance

Produced resin composition pellets were fed into a small-sized injection molding machine (product name: IS-100GN manufactured by Toshiba Machine Co., Ltd.), of which the cylinder temperature was set to 280° C., and were molded under conditions of a mold temperature of 70° C., an injection pressure of 75 MPa, an injection time of 20 seconds, and a cooling time of 15 seconds to obtain a flat plate of 120 mm×80 mm×3 mm.

From this flat plate, a test specimen in a strip shape (80 mm×12.5 mm×3 mm) was cut out such that the longitudinal direction thereof extended so as to be perpendicular to the flow direction. Using a jig, the test specimen was mounted on a curved surface of a bending bar having a parabolic shape in a vertical cross section represented by the equation of $y^2=6x$ ($x\geq0$ and $y\geq0$) with the x-axis in the horizontal direction and the y-axis in the vertical direction so that there was no gap between the bar and test specimen. In the vertical cross section of the bending bar, the test specimen was placed such that the end of the test specimen to start a measurement was positioned at the point where x=0 and y=0, and the end of the test specimen to terminate the measurement was positioned at the point where x>0 and y>0.

After the test specimen was attached to the bending bar as described above, the test specimen was sprayed with 5-56 (manufactured by Kure Kogyo Co., Ltd.) on the surface thereof and was left to stand under conditions of 23° C. and 50% RH for 48 hours. If a crack occurred on the surface of the test specimen after 48 hours, the critical position where the crack occurred (the position where the value of x became the largest in the x-axis direction of the bending bar) was read.

Before reading the critical position where the crack occurred, coordinates of positions on the x-axis of the bending bar were marked as scales on the test specimen which was attached to the bending bar. After the test specimen was removed from the bending bar, the test specimen was observed to determine whether there was a crack of a predetermined size described below. The position of a crack, if any, was read by referring to the marked scales (the critical position was the position corresponding to the x-axis coordinate of the bending bar, but not periphery length of the test specimen).

Note that a crack was defined as one found in a size of 200 μm or more in the flow direction when the surface of the test specimen was observed under a microscope such as VHX-5000 (manufactured by Keyence Corporation).

The critical strain was calculated by the following equation from the critical position where the crack occurred and the thickness of the test specimen:

$$(\text{Critical strain})=d\times 3^{1/2}/\{2\times(3+50.8x)^{3/2}\}\times 100(\%)$$

d: Thickness of the test specimen (mm)
x: Position in the x-axis direction (mm)

(2) Impact Resistance

Produced resin composition pellets were dried at 100° C. for 2 hours. A test specimen was prepared according to ISO-15103 from the dried resin composition pellets using the injection molding machine IS-100GN manufactured by Toshiba Machine Co., Ltd. (wherein the cylinder temperature was set to 280° C. and the mold temperature was set to 80° C.). Then, a notch was provided in accordance with ISO-179 to the center of the test specimen to produce a notched Charpy impact test piece. The Charpy impact strength at 23° C. of the notched Charpy impact test piece was measured in accordance with ISO-179 as an impact resistance evaluation.

(3) Flame Retardance

Produced resin composition pellets were fed into the small-sized injection molding machine (product name: IS-100GN manufactured by Toshiba Machine Co., Ltd.), of which the cylinder temperature was set to 280° C., and were molded under conditions of a mold temperature of 70° C. and an injection pressure of 60 MPa to prepare five specimens (thickness: 3.0 mm) for UL94 vertical flame test measurements. The flame retardance of these five specimens was evaluated based on the UL94 vertical flame test method. A flame was brought into contact with each specimen for 10 seconds and then removed, and the combustion time until a flame on the specimen extinguished after removal was taken to be t1 (s). Thereafter, a flame was brought into contact with the specimen for a further 10 seconds and then removed, and the combustion time until a flame on the specimen extinguished after removal was taken to be t2 (s). For each of the five specimens, the average value of t1 and t2 was determined as the average combustion time. Moreover, a longest combustion time among the 10 measurements of t1 and t2 was determined as the longest combustion time. A judgment of V-0, V-1, V-2, or HB was made based on UL94 regulations.

In particular, a resin composition was determined to have an excellent flame retardancy when the flame retardancy level was determined to be V-1 or higher.

(4) Morphology

A measurement cross section is prepared from a piece of the core portion (center portion in the thickness direction) of the test specimen produced in the same manner as in the (1) chemical resistance described above using an ultramicrotome. After the measurement cross section was stained with ruthenium tetroxide, an image of the measurement cross section was taken under HITACHI SU8220 (manufactured by Hitachi High-Tech Fielding Corporation) with settings of an imaging magnification of 10,000 times, an acceleration voltage of 1.0 kV, and a detector: secondary electrons (UPPER: LA). A digitalized SEM image of the cross section was obtained (number of pixels: 1280×960), to thereby obtain a morphology image.

Next, the obtained morphology image was binarized in the following procedure using image processing software imageJ (version 1.50i).

First, the morphology image was opened, and an area to be binarized (pixels in number corresponding to a 3-μm square or a 5-μm square) was selected. The selected image was smoothed using the median filter of the image processing software ImageJ and was binarized using a threshold to obtain a first or second processed image. Upon the binarization, the default binarization algorithm and the auto threshold were used. In the first or second processed image obtained as described above, all of portions that were black after the binarization were extracted by "Analyze Particles" command of the image processing software imageJ. The number per unit area of the first or second black portions (number/μm$^2$), or the total peripheral length of the peripheral lengths of the first or second non-small portions (μm/μm$^2$) (L1 or L2) was determined by calculating the number of pixels in the portions per se and the number of pixels surrounding the portions. Further, by extracting all of portions that were white after a binarization and calculating the number of pixels in these portions, the occupied area by the first or second white portions per unit area (μm$^2$/μm$^2$) (AW1 or AW2) was obtained.

It should be noted that five sets of first and second processed images obtained through a binarization were generated from one in-vehicle LiB member. Average values obtained by averaging the respective measurement values obtained from the respective five images were used as measurement results. Further, upon binarizing each morphology image, the pixels of 2×2 were cut off.

(5) Flexural Vibration Fatigue Characteristic

Produced resin composition pellets were fed into the small-sized injection molding machine (product name: IS-100GN manufactured by Toshiba Machine Co., Ltd.), of which the cylinder temperature was set to 280° C., and were molded under conditions of a mold temperature of 70° C. and an injection pressure of 60 MPa to obtain Type A cantilever flexural fatigue test pieces for Method B of ASTM D671. Flexural stresses (repetitive stresses: 25 MPa) that cyclically varied were repeatedly applied to the test piece under the following test conditions in accordance with Method B of ASTM D671 until the test piece was destroyed and the number of repetitions is measured. For each composition, three test pieces were used for each of the condition where no cutting oil was applied and the condition where a cutting oil was applied, and the results were averaged. In the condition where a cutting oil was applied, the cutting oil was applied to one side of a part to undergo vibrations (curved portion not fixed by a jig) of the cantilever flexural fatigue test piece, and left to stand under the condition of 23° C. and 50 RH % for 3 hours before performing the test.

Tested resin compositions: resin composition of Example 8 and resin composition of Comparative Example 1

Tester: Repeated flexural vibration fatigue tester B-70 manufactured by Toyo Seiki Seisaku-sho, Ltd.

Repetition frequency: 30 Hz (repeating rate: 1800 times/minute)

Measurement temperature: room temperature (23° C.)

Repetitive stress: 25 MPa

Cutting oil: Honilo 988 (manufactured by Castrol)

Examples 1 to 19 and Comparative Examples 1 to 8

The following describes the examples and comparative examples in detail.

A twin screw extruder (ZSK-25 produced by Coperion Inc.) was used as a melt-kneading machine for producing resin compositions in the examples and comparative examples. L/D of the extruder was 35.

The twin screw extruder was configured to include, in the direction of raw material flow, a first raw material feed inlet located on an upstream side, a first vacuum vent located downstream to the first raw material feed inlet, a second raw material feed inlet located downstream to the first vacuum vent, a liquid feed pump located downstream to the second raw material feed inlet, and a second vacuum vent located downstream to the liquid feed pump.

Pellets of each resin composition were produced at the barrel setting temperatures of the twin screw extruder from the first raw material feed inlet to the first vacuum vent of 320° C. and 270° C. on the downstream to the second raw material feed inlet, a screw rotation number of 450 rpm, and an extrusion rate of 15 kg/h. The configuration of the twin screw extruder is shown in Table 1.

TABLE 1

| | 1st raw material feed inlet C1 | C2 | C3 | C4 | 1st vacuum vent C5 | 2nd raw material feed inlet C6 | Liquid feed pump C7 | C8 | C9 | C10 | 2nd vacuum vent C11 | C12 |
|---|---|---|---|---|---|---|---|---|---|---|---|---|
| Settting temperature | 320° C. | | | | | | 270° C. | | | | | |

Pellets of each resin composition were obtained by feeding (a) to (e) components to the twin screw extruder that had been set as described above under the conditions summarized in Tables 2 and 3. The screw rotation speed of the extrusion conditions of Example 1 was changed to 300 rpm in Example 19, and the screw rotation speed of the extrusion conditions of Example 1 was changed to 900 rpm in Comparative Example 8.

In the examples and comparative examples, physical property tests were carried out by the previously described measurement methods (1) to (5). The results are listed in Tables 2 to 4. Note that the occupied area AW2 by the second black portions per unit area in Example 9 was 0.118 μm$^2$/μm$^2$.

TABLE 2

| | | | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|---|
| 1st raw material feed inlet | Component (a-i) | parts by mass | 79 | 79 | 79 | 79 | — | 79 | 79 | 79 | 79 | 79 |
| | Component (a-ii) | parts by mass | — | — | — | — | 79 | — | — | — | — | — |
| | Component (b-i) | parts by mass | — | — | — | — | — | — | — | — | — | — |
| | Component (b-ii) | parts by mass | — | — | — | — | — | — | — | — | — | — |
| | Component (b-iv) | parts by mass | 5 | 5 | 5 | 5 | 5 | 5 | 5 | 5 | — | — |
| | Component (c-i) | parts by mass | — | — | — | — | — | — | — | — | — | — |
| | HIPS | parts by mass | — | — | — | — | — | — | — | — | — | — |
| 2nd raw material feed inlet | Component (b-i) | parts by mass | 21 | 10.5 | 10.5 | 21 | 20 | — | — | 10.5 | 6 | 3 |
| | Component (b-ii) | parts by mass | — | — | — | — | — | 21 | — | — | — | — |
| | Component (b-iii) | parts by mass | — | — | — | — | — | — | 21 | — | — | — |
| | Component (b-v) | parts by mass | — | 10.5 | — | — | — | — | — | — | — | 3 |
| | Component (b-vi) | parts by mass | — | — | 10.5 | — | — | — | — | — | — | — |
| | Component (c-i) | parts by mass | — | — | — | — | — | — | — | 10.5 | 10.5 | 10.5 |
| | Component (c-ii) | parts by mass | — | — | — | — | — | — | — | — | — | — |
| | Component (c-iii) | parts by mass | — | — | — | — | — | — | — | — | — | — |
| | Component (e) | parts by mass | 5 | 5 | 5 | — | — | 5 | 5 | 5 | 5 | 5 |
| Liquid feed pump | Component (d) | parts by mass | 18 | 18 | 18 | — | — | 18 | 18 | 18 | 18 | 18 |

TABLE 2-continued

| Morphology | Number of first black portions per unit area | number/μm² | 37.8 | 34.3 | 40.9 | 38.6 | 38.0 | 39.5 | 36.7 | — | — | — |
|---|---|---|---|---|---|---|---|---|---|---|---|---|
| | Length L1 relative to occupied area AW1 | μm⁻¹ | 33.7 | 36.5 | 26.1 | 33.9 | 34.9 | 32.7 | 34.5 | — | — | — |
| | Number of first small to medium portions per unit area | number/μm² | 30.2 | 26.4 | 33.7 | 31.2 | 29.0 | 30.1 | 29.5 | — | — | — |
| | Number of second black portions per unit area | number/μm² | — | — | — | — | — | — | — | 19.4 | 22.3 | 15.1 |
| | Length L2 relative to occupied area AW2 | μm⁻¹ | — | — | — | — | — | — | — | 18.1 | 9.5 | 14.3 |
| | Number of second small to medium portions per unit area | number/μm² | — | — | — | — | — | — | — | 17.0 | 19.0 | 12.7 |
| | Chemical resistance | % | 1.11 | 1.53 | 0.61 | 1.17 | 1.24 | 1.05 | 1.06 | 0.97 | 0.80 | 0.95 |
| | Impact resistance | kJ/m² | 25.1 | 21.3 | 32.1 | 26.2 | 24.3 | 24.8 | 24.5 | 54.1 | 53.5 | 38.7 |
| | Flame Retardancy | Grade | V-0 | V-0 | V-0 | — | — | V-0 | V-0 | V-0 | V-0 | V-0 |

| | | | Ex. 11 | Ex. 12 | Ex. 13 | Ex. 14 | Ex. 15 | Ex. 16 | Ex. 17 | Ex. 18 | Ex. 19 |
|---|---|---|---|---|---|---|---|---|---|---|---|
| 1st raw material feed inlet | Component (a-i) | parts by mass | 79 | 79 | 79 | 79 | 79 | 79 | 79 | 79 | 79 |
| | Component (a-ii) | parts by mass | — | — | — | — | — | — | — | — | — |
| | Component (b-i) | parts by mass | — | — | — | — | — | — | — | 3 | 3 |
| | Component (b-ii) | parts by mass | — | — | — | — | — | — | — | — | — |
| | Component (b-iv) | parts by mass | — | — | 5 | 5 | — | — | — | 5 | 5 |
| | Component (c-i) | parts by mass | — | — | — | — | — | — | — | — | — |
| | HIPS | parts by mass | — | — | — | — | — | — | — | — | — |
| 2nd raw material feed inlet | Component (b-i) | parts by mass | 3 | 6 | — | — | — | — | — | 7.5 | 7.5 |
| | Component (b-ii) | parts by mass | — | — | — | — | — | — | — | — | — |
| | Component (b-iii) | parts by mass | — | — | — | — | — | — | — | — | — |
| | Component (b-v) | parts by mass | — | — | — | — | — | — | — | — | — |
| | Component (b-vi) | parts by mass | 3 | — | — | — | — | — | — | — | — |
| | Component (c-i) | parts by mass | 10.5 | 10.5 | 21 | — | 21 | 10.5 | 21 | 10.5 | 10.5 |
| | Component (c-ii) | parts by mass | — | — | — | 21 | — | — | — | — | — |
| | Component (c-iii) | parts by mass | — | — | — | — | — | 10.5 | — | — | — |
| | Component (e) | parts by mass | 5 | — | 5 | 5 | 5 | 5 | — | 5 | 5 |
| Liquid feed pump | Component (d) | parts by mass | 18 | — | 18 | 18 | 18 | 18 | — | 18 | 18 |
| Morphology | Number of first black portions per unit area | number/μm² | — | — | — | — | — | — | — | — | — |
| | Length L1 relative to occupied area AW1 | μm⁻¹ | — | — | — | — | — | — | — | — | — |
| | Number of first small to medium portions per unit area | number/μm² | — | — | — | — | — | — | — | — | — |
| | Number of second black portions per unit area | number/μm² | 28.4 | 23.2 | 12.1 | 11.5 | 10.7 | 8.8 | 10.4 | 17.2 | 18.1 |
| | Length L2 relative to occupied area AW2 | μm⁻¹ | 7.6 | 9.8 | 10.7 | 10.3 | 12.8 | 14.9 | 13.1 | 13.3 | 15.2 |
| | Number of second small to medium portions per unit area | number/μm² | 22.6 | 20.1 | 10.3 | 9.5 | 9.3 | 7.5 | 9.5 | 15.5 | 17.0 |
| | Chemical resistance | % | 0.54 | 0.93 | 1.26 | 1.30 | 1.53 | 1.72 | 1.61 | 0.70 | 0.75 |
| | Impact resistance | kJ/m² | 58.7 | 54.9 | 27.4 | 27.7 | 23.4 | 25.3 | 24.9 | 38.9 | 41.6 |
| | Flame Retardancy | Grade | V-0 | — | V-0 | V-0 | V-0 | V-0 | — | V-0 | V-0 |

TABLE 3

| | | | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|---|---|
| 1st raw material feed inlet | Component (a-i) | parts by mass | 65 | 79 | 79 | 79 | 79 | 79 | 79 | 79 | 79 |
| | Component (a-ii) | parts by mass | — | — | — | — | — | — | — | — | — |
| | Component (b-i) | parts by mass | — | — | — | — | — | — | 10.5 | 10.5 | — |
| | Component (b-ii) | parts by mass | — | — | — | — | — | — | — | — | — |

TABLE 3-continued

|  |  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|---|---|
|  | Component (b-iv) | parts by mass | — | 5 | 5 | — | — | — | 5 | 5 | — |
|  | Component (c-i) | parts by mass | — | — | — | — | — | — | — | — | 21 |
|  | HIPS | parts by mass | 10 | — | — | — | — | — | — | — | — |
| 2nd raw material feed inlet | Component (b-i) | parts by mass | — | — | — | — | — | — | — | — | — |
|  | Component (b-ii) | parts by mass | — | — | — | — | — | — | — | — | — |
|  | Component (b-iii) | parts by mass | — | — | — | — | — | — | — | — | — |
|  | Component (b-v) | parts by mass | — | 21 | — | 6 | — | — | — | — | — |
|  | Component (b-vi) | parts by mass | — | — | 21 | — | 6 | — | — | — | — |
|  | Component (c-i) | parts by mass | — | — | — | 10.5 | 10.5 | — | 10.5 | 10.5 | — |
|  | Component (c-ii) | parts by mass | — | — | — | — | — | — | — | — | — |
|  | Component (c-iii) | parts by mass | — | — | — | — | — | 21 | — | — | — |
|  | Component (e) | parts by mass | 5 | 5 | 5 | 5 | 5 | 5 | 5 | 5 | 5 |
| Liquid feed pump | Component (d) | parts by mass | 18 | 18 | 18 | 18 | 18 | 18 | 18 | 18 | 18 |
| Morphology | Number of first black portions per unit area | number/μm² | — | 27.2 | 39.6 | — | — | — | — | — | — |
|  | Length L1 relative to occupied area AW1 | μm⁻¹ | — | 42.3 | 22.1 | — | — | — | — | — | — |
|  | Number of first small to medium portions per unit area | number/μm² | — | 22.8 | 35.7 | — | — | — | — | — | — |
|  | Number of second black portions per unit area | number/μm² | — | — | — | 6.9 | 15.0 | 6.4 | 15.4 | 13.1 | 7.7 |
|  | Length L2 relative to occupied area AW2 | μm⁻¹ | — | — | — | 16.8 | 5.3 | 16.5 | 6.5 | 2.3 | 4.1 |
|  | Number of second small to medium portions per unit area | number/μm² | — | — | — | 5.8 | 14.6 | 5.4 | 13.2 | 12.6 | 6.2 |
|  | Chemical resistance | % | 0.28 | 1.72 | 0.43 | 1.01 | 0.37 | 1.71 | 0.39 | 0.25 | 0.37 |
|  | Impact resistance | kJ/m² | 14.9 | 17.5 | 33.2 | 17.3 | 59.7 | 18.3 | 30.2 | 27.7 | 18.3 |
|  | Flame Retardancy | Grade | V-0 | V-0 | V-0 | V-0 | V-0 | V-0 | V-0 | V-0 | V-0 |

TABLE 4

|  |  |  | Ex. 8 | Comp. Ex. 1 |
|---|---|---|---|---|
| 1st raw material feed inlet | Component (a-i) | parts by mass | 79 | 65 |
|  | Component (a-ii) | parts by mass | — | — |
|  | Component (b-i) | parts by mass | — | — |
|  | Component (b-ii) | parts by mass | — | — |
|  | Component (b-iv) | parts by mass | 5 | — |
|  | Component (c-i) | parts by mass | — | — |
|  | HIPS | parts by mass | — | 10 |
| 2nd raw material feed inlet | Component (b-i) | parts by mass | 10.5 | — |
|  | Component (b-ii) | parts by mass | — | — |
|  | Component (b-iii) | parts by mass | — | — |
|  | Component (b-v) | parts by mass | — | — |
|  | Component (b-vi) | parts by mass | — | — |
|  | Component (c-i) | parts by mass | 10.5 | — |
|  | Component (c-ii) | parts by mass | — | — |
|  | Component (c-iii) | parts by mass | — | — |
|  | Component (e) | parts by mass | 5 | 5 |
| Liquid feed pump | Component (d) | parts by mass | 18 | 18 |
| Flexural vibration fatigue characteristic | Without cutting oil | Times | 45000 | 58000 |
|  | With cutting oil | Times | 45000 | 28000 |

As summarized in Tables 2 and 3, it was found that the in-vehicle LiB members of the examples had certain morphologies, and the critical strains in the chemical resistance evaluations and the Charpy impact strengths were within respective predetermined ranges, compared to the in-vehicle LiB members of Comparative Examples.

As summarized in Table 4, it was found that the in-vehicle LiB member of Example 8 did not have a decrease in the vibration fatigue characteristic even when the chemical agent (cutting oil) was adhered, and was excellent in the retention property of a device and the connection retention capability of structural bodies when the chemical agent was adhered, as compared to the in-vehicle LiB member of Comparative Example 1.

INDUSTRIAL APPLICABILITY

According to the present disclosure, an in-vehicle lithium ion battery member can be obtained, which allows for complication of shape and weight reduction of a molded article, as well as capable of securely holding various devices provided in an in-vehicle lithium ion battery, or securely connecting and retaining structural bodies. The in-vehicle lithium ion battery member can be used, in an in-vehicle lithium ion battery module having a plurality of battery cells of a hybrid electric vehicle or an electric vehicle (including a motorcycle), as a holding member for holding the battery cells and other devices constituting the battery module, or the like in the battery module, or a member constituting a container of the module such as a housing, and a lid.

The invention claimed is:

1. An in-vehicle lithium ion battery member produced by molding a resin composition containing (a) a polyphenylene ether resin and (c) olefinic polymer constituted from an olefin, the resin composition having a critical strain in a chemical resistance evaluation of 0.5% or more and a Charpy impact strength at 23° C. of 20 kJ/m² or more, wherein
a sea-island phase structure having a sea phase containing the (a) component and island phases containing the (c) component and present in the sea phase is formed in a morphology image of the in-vehicle lithium ion battery member, and in a second processed image obtained through a binarization of the morphology image,
a number per unit area of second black portions that are black after the binarization and have an area of $4.92 \times 10^{-4}$ μm$^2$ or more is 8/μm$^2$ or more, and in a case where AW2 (μm$^2$/μm$^2$) represents an occupied area per unit area by second white portions that are white after the binarization, and L2 (μm/μm$^2$) represents a length per unit area of a total peripheral length which is a sum of peripheral lengths of second non-small portions having an area of $15 \times 10^{-4}$ μm$^2$ or more among the second black portions, the length L2 relative to the occupied area AW2 (L2/AW2) is 7 μm$^{-1}$ or more.

2. The in-vehicle lithium ion battery member according to claim 1, wherein a number per unit area of second small to medium portions having an area of $4.92 \times 10^{-4}$ to $100 \times 10^{-4}$ μm$^2$ among the second black portions is 6/μm$^2$ or more.

3. The in-vehicle lithium ion battery member according to claim 1, wherein the resin composition for the in-vehicle lithium ion battery member contains (b) the hydrogenated block copolymer in which at least a part of a block copolymer containing at least one polymer block composed primarily of a vinyl aromatic compound and at least one polymer block composed primarily of a conjugated diene compound is hydrogenated and/or a modified product of the hydrogenated block copolymer.

4. The in-vehicle lithium ion battery member according to claim 1, wherein a flammability level of the resin composition for the in-vehicle lithium ion battery member measured based on a UL94 vertical flame test is V-0.

5. The in-vehicle lithium ion battery member according to claim 1, further containing (d) a phosphate ester compound.

6. The in-vehicle lithium ion battery member according to claim 1, further comprising (e) a phosphinate, and
wherein the (e) component contains at least one phosphinate selected from the group consisting of:
a phosphinate represented by the following general formula (1)

[Chemical Formula 1]

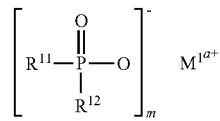

(1)

[in formula (1), $R^{11}$ and $R^{12}$ are each independently a linear or branched alkyl group having a carbon number of 1 to 6 and/or an aryl group having a carbon number of 6 to 10; $M^1$ is at least one selected from the group consisting of a calcium ion, a magnesium ion, an aluminum ion, a zinc ion, a bismuth ion, a manganese ion, a sodium ion, a potassium ion, and a protonated nitrogenous base; a is an integer of 1 to 3; m is an integer of 1 to 3; and a=m]; and a diphosphinate represented by the following formula (2)

[Chemical Formula 2]

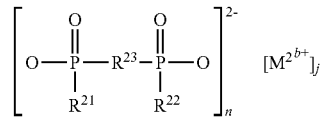

(2)

[in formula (2), $R^{21}$ and $R^{22}$ are each independently a linear or branched alkyl group having a carbon number of 1 to 6 and/or an aryl group having a carbon number of 6 to 10; $R^{23}$ is a linear or branched alkylene group having a carbon number of 1 to 10, an arylene group having a carbon number of 6 to 10, an alkylarylene group having a carbon number of 6 to 10, or an arylalkylene group having a carbon number of 6 to 10; $M^2$ is at least one selected from the group consisting of a calcium ion, a magnesium ion, an aluminum ion, a zinc ion, a bismuth ion, a manganese ion, a sodium ion, a potassium ion, and a protonated nitrogenous base; b is an integer of 1 to 3; n is an integer of 1 to 3; j is an integer of 1 or 2; and b×j=2n].

\* \* \* \* \*